May 6, 1941.  W. H. ROBERTSON ET AL  2,241,272
CASH REGISTER
Filed June 22, 1938   10 Sheets-Sheet 10
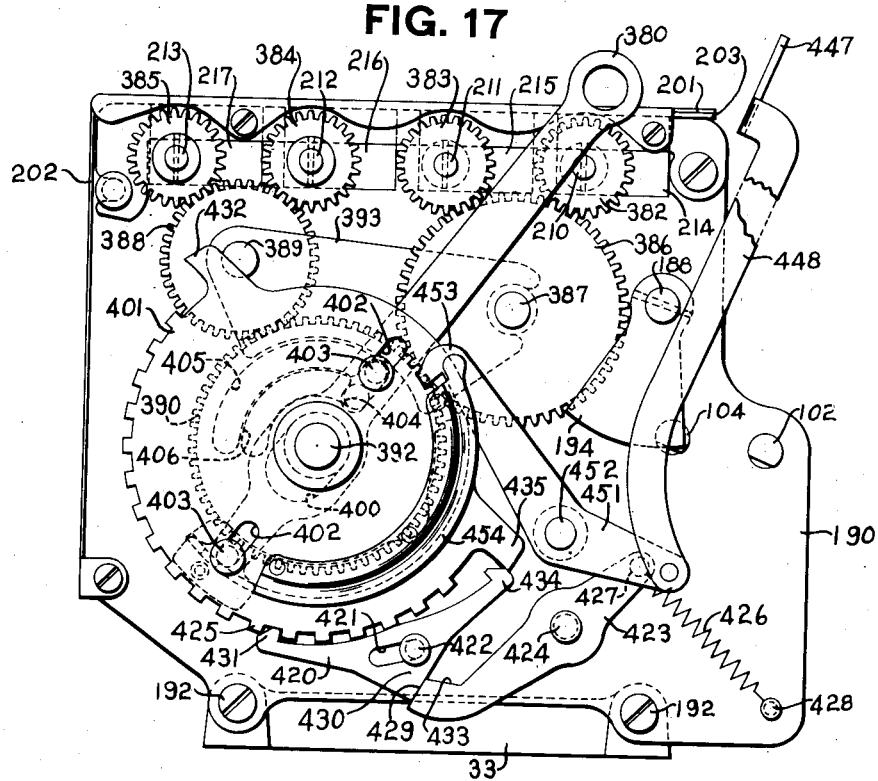
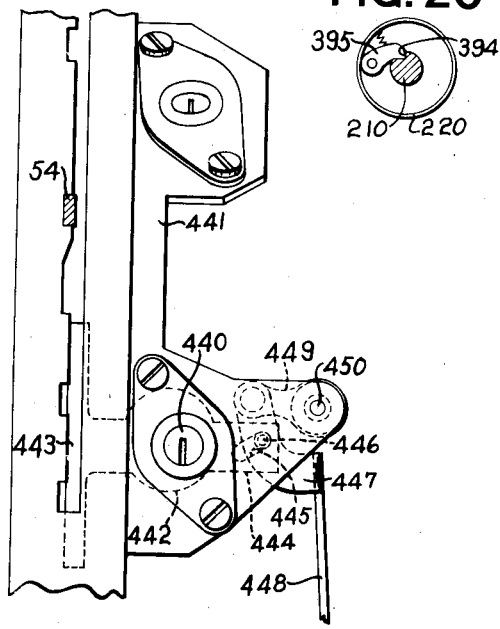
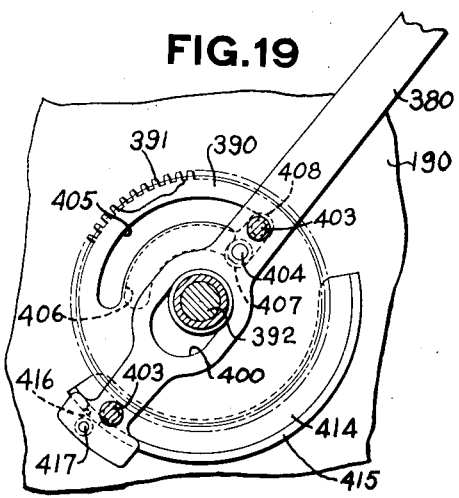
Inventor
William H. Robertson
and John P. Frank
By Carl Benst
Their Attorney Patented May 6, 1941

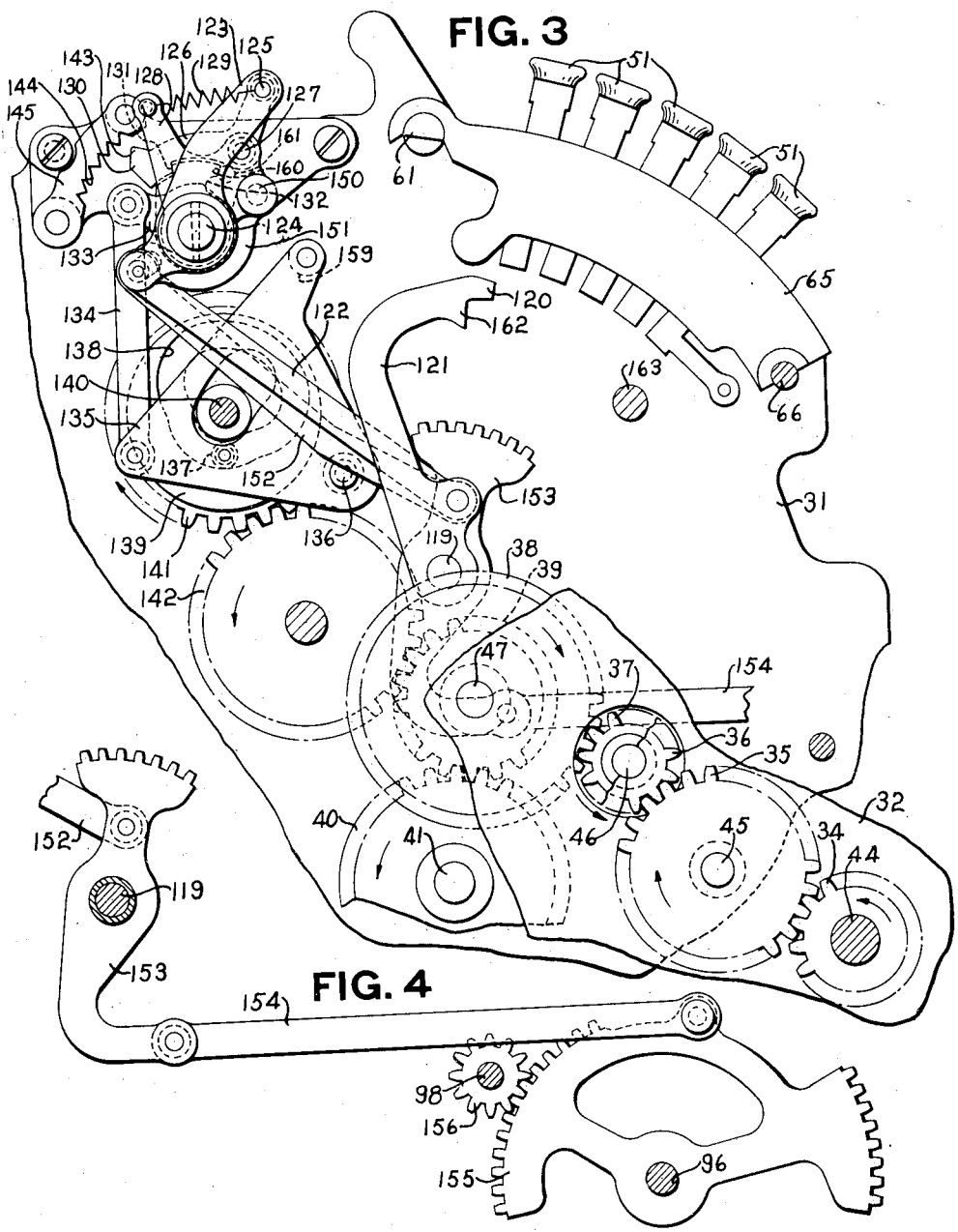

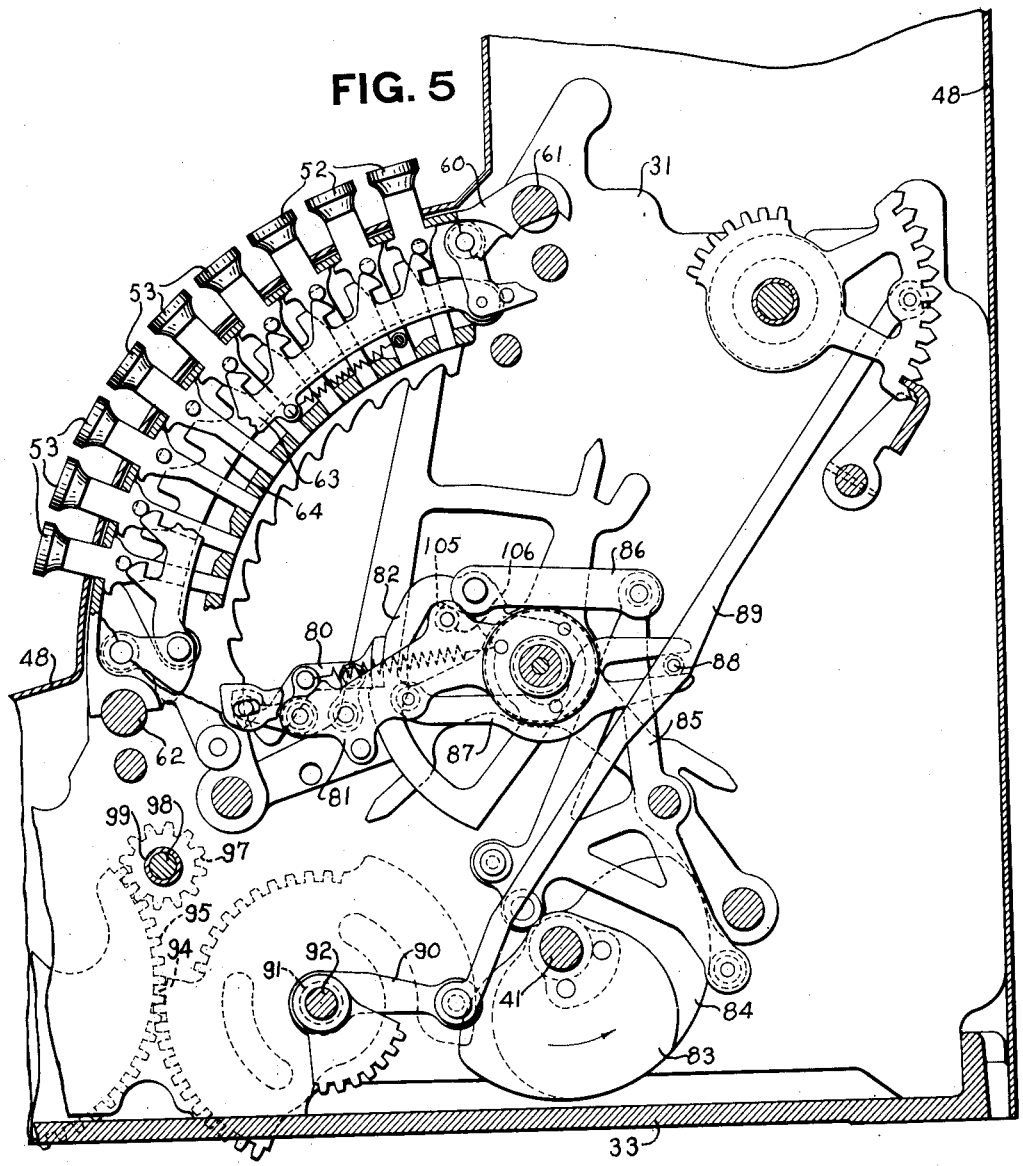

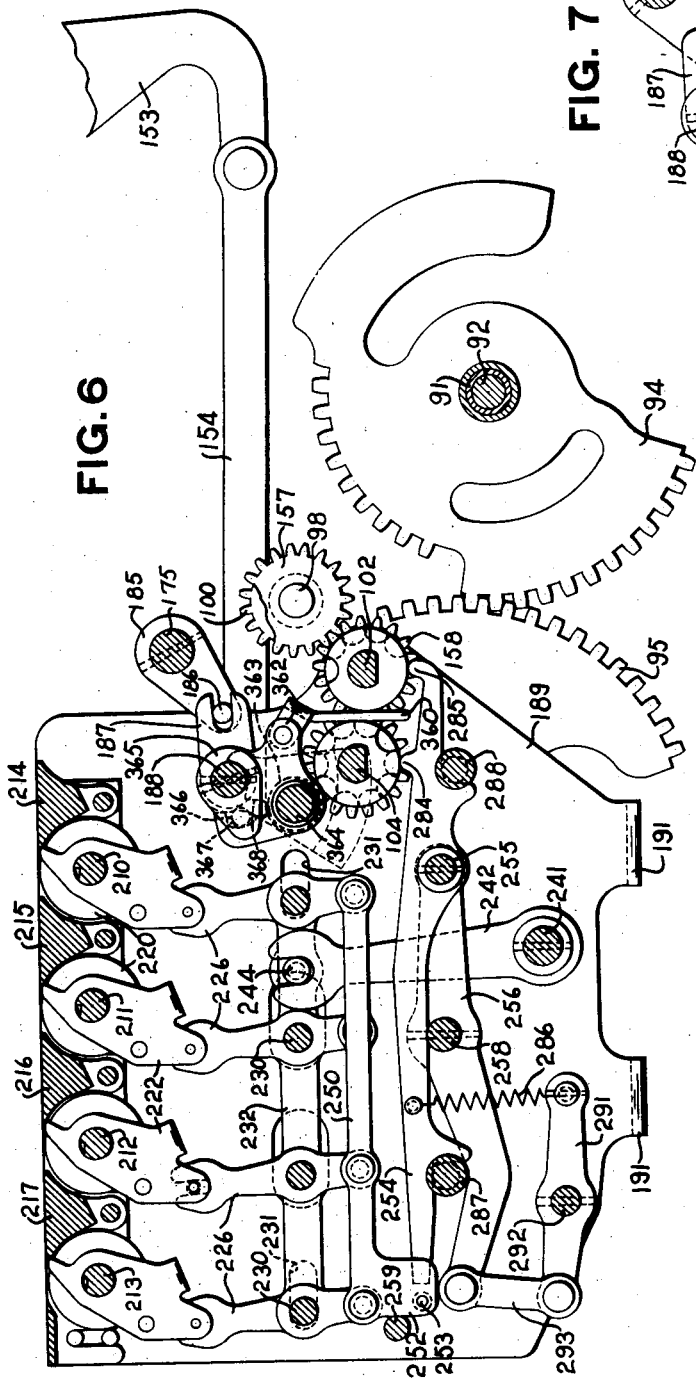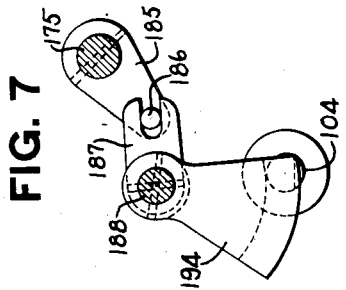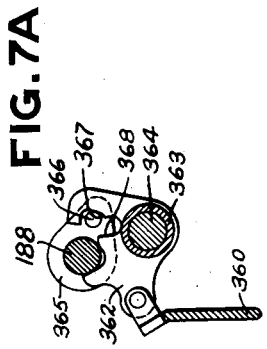

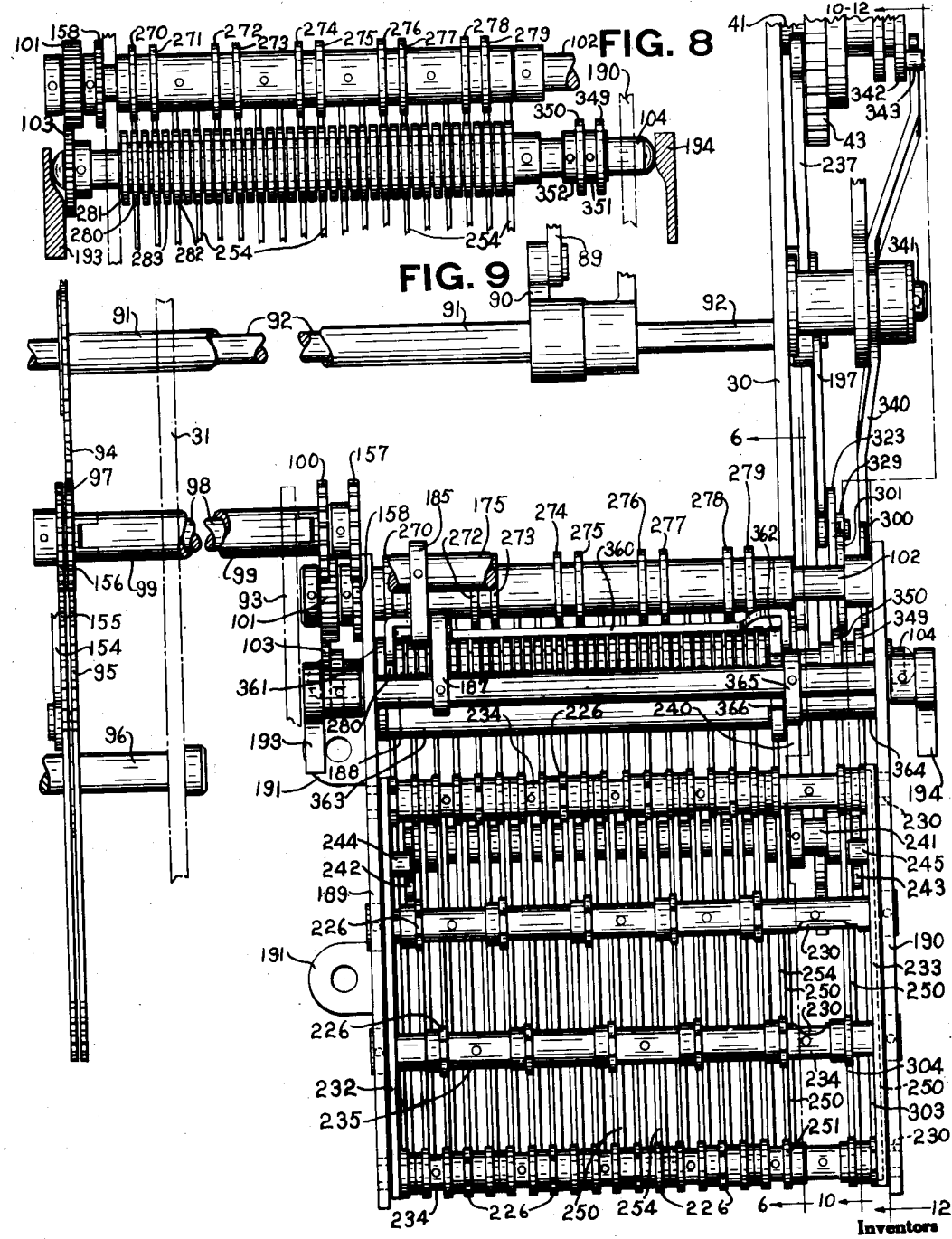

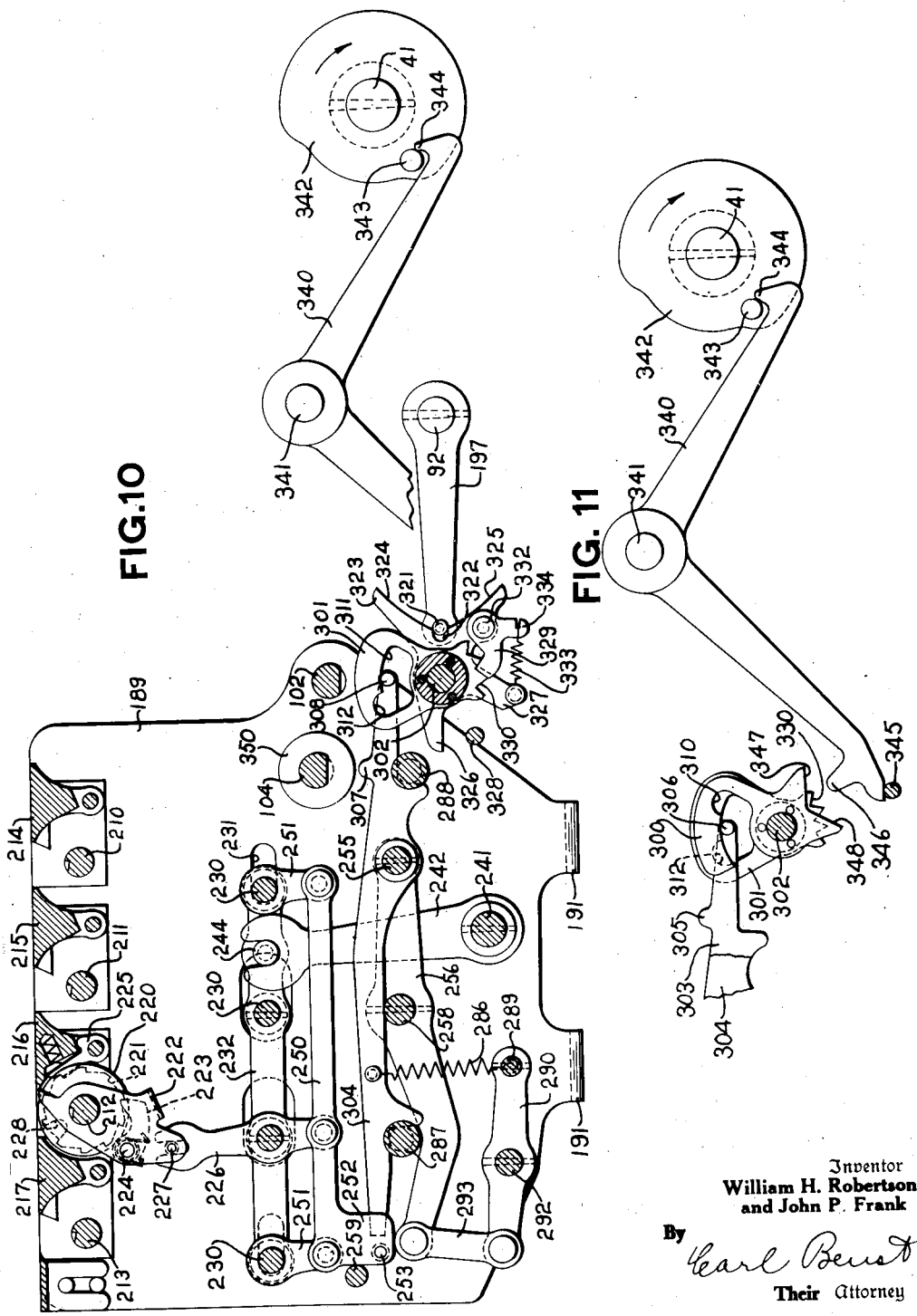

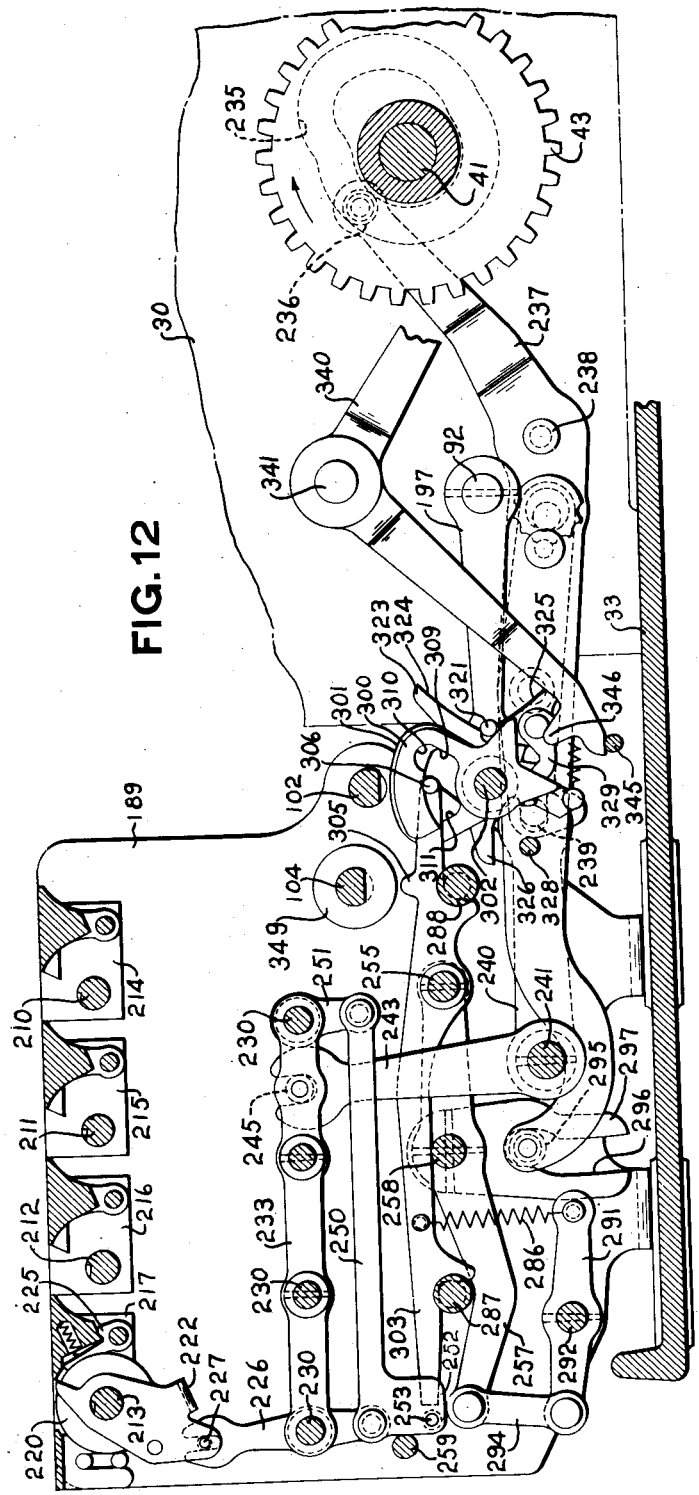

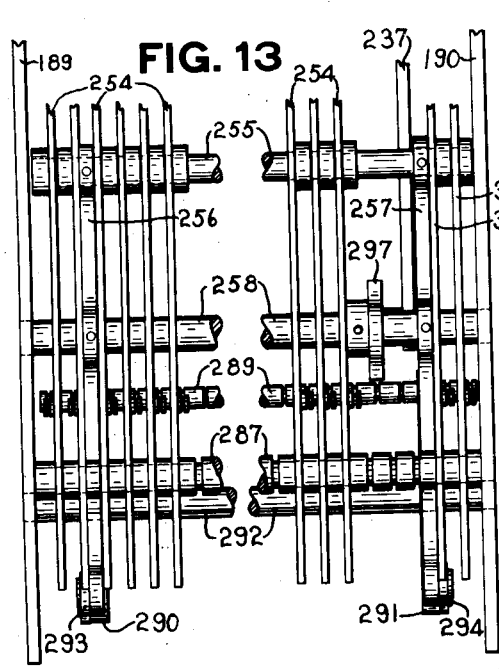
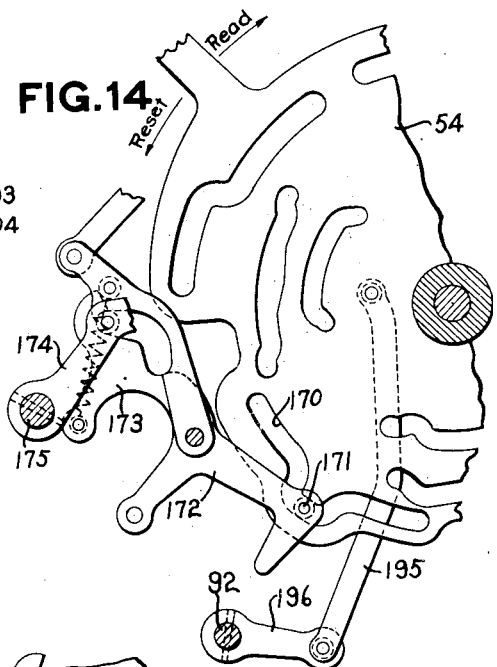
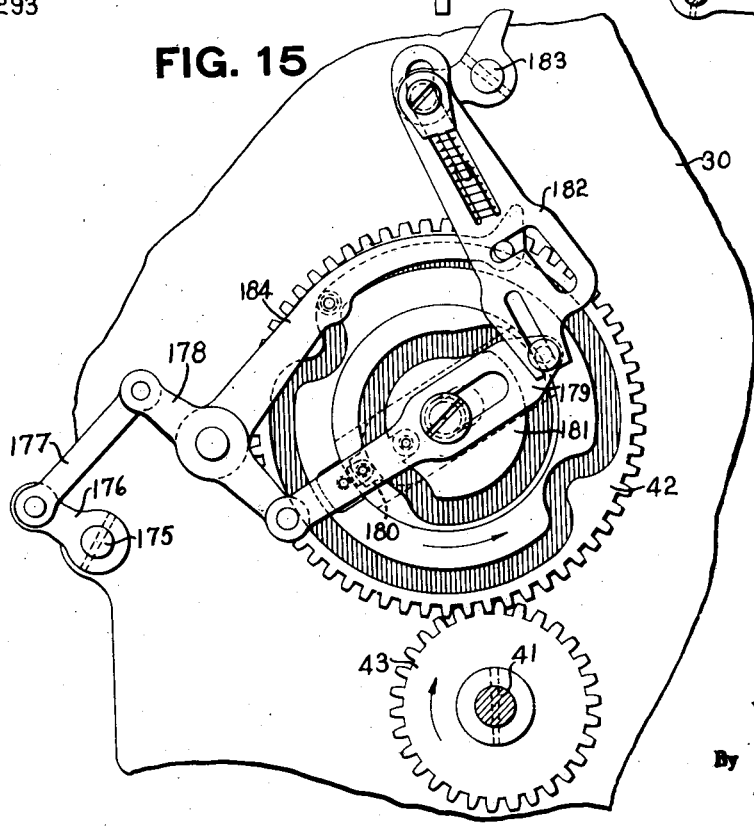

2,241,272

UNITED STATES PATENT OFFICE 2,241,272

CASH REGISTER

William H. Robertson and John P. Frank, Dayton, Ohio, assignors to The National Cash Register Company, Dayton, Ohio, a corporation of Maryland Application June 22, 1938, Serial No. 215,131

15 Claims. (Cl. 235—6)

This invention relates to cash registers and accounting machines, and particularly to novel special counters and novel selecting means therefor. While the invention is especially adapted for use in machines where the special counters are selected under control of keys, it is also adaptable for use in machine employing levers, slides or the like for controlling the selecting of said counters.

The invention is here disclosed as incorporated in a machine of the type disclosed in Letters Patent of the United States No. 1,865,147, issued June 28, 1932, to Bernis M. Shipley, and reference is hereby made to that patent for a disclosure of the mechanism not specifically described herein.

Hitherto in such types of machines each control key individually selected for operation a special counter associated therewith, thus making it possible to only select the same number of special counters as there were control keys depressed, consequently each counter was only capable of registering the number of times that the machine was operating with its corresponding key depressed.

The present invention contemplates the selection of a variable number of special counters for operation by depression of a fixed number of control keys. Instead of having each control key individually select a counter for operation the present invention calls for a combination of a fixed number of control keys in separate key banks for selecting variable combinations of counters for operation. For example, from one to five, or even more, counters may be selected for operation by depression of a fixed number of control keys, the particular counters thus selected being determined by the particular combination of keys depressed. It is also possible with this type of selecting means to select the same counter for operation when different combinations of keys are depressed.

In addition, the present invention provides new and novel means, under control of a total taking device, for superseding the control exercised by the depressed control keys in the selection of the special counters whereby different counters may be selected. The purpose of this arrangement is, in the case of multiple item transactions, to select certain counters for operation when registering the items and to select different counters for operation when taking the total of said items.

With such an arrangement as above described it is possible to provide a greater number of special counters than is ordinarily the case in such types of machines and still employ the usual number of control keys for selecting the same. Also, such additional counters make it possible to record a greater variety of data concerning the transactions entered into the machine.

Also a new and novel means is provided for resetting the counters to zero.

An object of the invention is to provide a plurality of counters having a new and novel type of mechanism for selecting the same.

Another object is to provide a plurality of counters adapted to be selected in different numbers and combinations by a fixed number of control keys arranged in a plurality of banks.

Another important object is to provide new and novel means, under control of a fixed number of control keys, to select a variable number of special counters for simultaneous operation.

Another object is the provision of a plurality of groups of special counters, a plurality of control keys, and a plurality of mutilated disks adapted to be differentially positioned under control of a fixed number of said keys to select a counter in any one or all of said groups for operation.

An additional object is to provide a plurality of special counters and a plurality of rotatable members adapted to be differentially positioned under control of a fixed number of control keys to select a variable number of said counters, and a manipulative member adapted to supersede the control exercised by said keys in the selection of said counters and to effect a different selection of said counters.

Another object is to provide a plurality of special counters adapted to be selected by the depression of a fixed number of control keys, said control being modified by the operation of a total lever.

A further object is to provide a plurality of rotatable members adapted to control the effectivity of an actuating means for a special counter.

A still further object is to provide a plurality of mutilated disks adapted to be differentially positioned by a fixed number of control keys to render effective the actuating means for a special counter, and a manipulative member adapted to shift certain of said disks to render ineffective said counter actuating means.

An additional object is to provide new and novel means for resetting the counters to zero.

With these and incidental objects in view, the invention includes certain novel features of construction and combinations of parts the essential elements of which are set forth in appended claims and a preferred form or embodiment of which is hereinafter described with reference to the drawings which accompany and form part of this specification.

Of said drawings:

Fig. 3 is a detail side view of the clerks' bank of control keys, as viewed from the left, showing a portion of the mechanism controlled thereby for differentially positioning the counter selecting disks associated therewith.

Fig. 4 is a detail view of a part of the counter selecting drive means operated by the clerks' differential mechanism.

Fig. 5 is a detail side view of the transaction bank of keys, as viewed from the right, showing the mechanism controlled thereby for differentially positioning the counter selecting disks associated therewith.

Fig. 6 is a cross-sectional view, taken on line 6—6 of Fig. 9, looking in the direction of the arrows, showing the two lines of counter selecting disks, the counter actuating mechanism, and the means controlled by said disks for determining the effectivity of said actuating mechanism.

Fig. 7 is a detail side view of the means, under control of the total lever, for shifting one of said lines of counter selecting disks to effect a different selection of counters from that effected under control of the control keys.

Fig. 7A is a detail view of certain parts of the mechanism for blocking operation of all counters but the total counters in a total taking operation.

Fig. 8 is a top plan view of the two lines of counter selecting disks, showing the camming means, under control of the total lever, for shifting one of said lines of disks to effect a different selection of counters.

Fig. 9 is a top plan view of the counter selecting mechanism, showing a portion of the mechanism controlled by the control keys for differentially positioning the disks, and the means under control of the total lever for shifting one of said lines of disks.

Fig. 10 is a section on line 10—10 of Fig. 9 looking in the direction of the arrows and the means for selecting the sub-total counter.

Fig. 11 is a detail side view of the two members which control the selection of the "Total" and "Sub-total" counters, and the means for rendering said members ineffective during the second cycle of a two cycle operation.

Fig. 12 is a cross-sectional view, taken on line 12—12 of Fig. 9, looking in the direction of the arrows, showing the means for actuating the counter selecting and operating mechanism, together with the means for controlling the selection of the "Total" and "Sub-total" counters.

Fig. 13 is a top plan view of a portion of the mechanism for operating the counter selecting and operating mechanisms.

Fig. 14 shows a portion of the total lever and mechanism operated thereby to cause one of the lines of selecting disks to be shifted.

Fig. 15 is a side elevation of the means, under control of the total lever, for conditioning the machine for either single cycle or two cycle operations.

Fig. 17 is a side view of the counter resetting mechanism.

Fig. 18 is a front view of means for locking out the total lever from its two lowermost positions of adjustment, and a portion of mechanism controlled by said lock for preventing operation of the counter reset mechanism.

Fig. 19 is a detail side view of the counter reset lever and its connections for resetting the counters to zero.

Fig. 20 is a detailed side view of one of the counter wheels.

GENERAL DESCRIPTION

Figure 1:
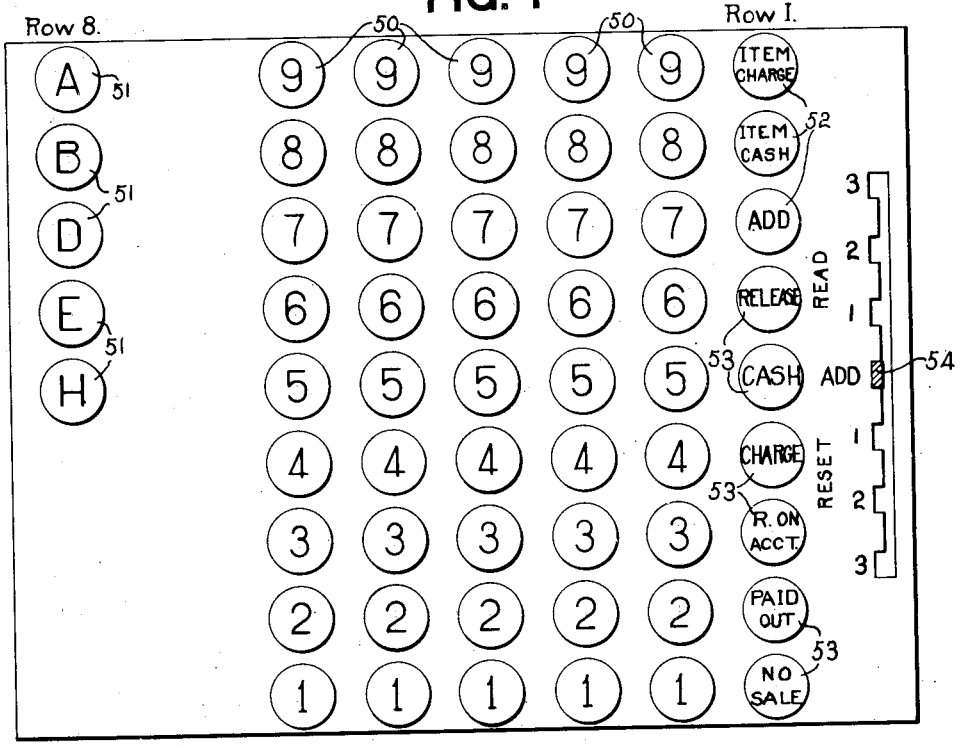
Fig. 1 is a view showing the keyboard arrangement.

Described in general terms, the present invention comprises a large number of special counters, grouped in several different lines conveniently located in front of the keyboard of the machine, with a new and novel arrangement for controlling the selection of the same.

The machine to which the present invention is shown applied is capable of registering single item and multiple item transactions. These transactions may be cash, charge or paid out transactions. The machine is also adapted to be operated by a plurality of clerks. In many businesses it is desired to know how many items have been sold by each clerk, the total number of cash items and the total number of charge items registered by all of the clerks, the number of complete transactions registered by each clerk, the total number of complete cash transactions and the total number of complete charge transactions registered by all of the clerks, and the total number of customers waited upon. The present invention is adapted to obtain all of this data by selecting counters in different combinations, depending upon whether the item entered is a single item representing a complete transaction or one of a plurality of items of a multiple item transaction. Thus, if clerk "A" depresses his key in combination with the "Cash" key, when entering a single item which comprises a complete transaction, the "A" counter, "A item" counter, "Cash" counter, "Cash items" counter and "Customer" counter are all simultaneously selected for operation.

Thus it is clear that even though only two keys, namely, the clerk "A" key and the "Cash" key, are depressed, the number of counters selected greatly differs from the number of keys depressed.

On the other hand, if clerk "A" depresses his key in combination with the "Item cash" key, when entering an item of a multiple item cash transaction, the "A item" counter and the "Cash items" counter will thereby be selected for operation. When taking the total of this multiple item transaction it is desired to add one into the "A" counter, "Cash" counter, "Customer" counter and "Total" counter. Therefore, with the "A" clerk's key and the "Item cash" key still depressed, the total lever is manually moved to its total taking position. The total lever, when moved to this position, supersedes the control exercised by the depressed keys in the selection of counters and selects the "A" counter, "Cash" counter, "Customer" counter and "Total" counter for operation.

It will thus be seen from the latter operation that while depression of the two control keys, namely, the clerk "A" key and the "Item cash" key, selects certain counters, the total lever, when moved to its total taking position, supersedes the control exercised by said depressed keys and selects a number of different counters.

The mechanism for accomplishing the above mentioned results will be described in detail hereinafter.

DETAILED DESCRIPTION

The special counters and the selecting means therefore which constitute the specific embodiment of the present invention are shown in the accompanying drawings in connection with an electrically driven machine, but it is understood that they can also be embodied in a manually operable machine without changing the construction of the mechanism.

FRAMEWORK

The various mechanisms of the machine are supported by a right side frame 30 (Fig. 15), a left side frame 31 (Figs. 3 and 5), and a printer frame 32 (Fig. 3) all of which are secured to a base 33.

OPERATING MECHANISM

The machine embodying the present invention may be operated either by an electric motor (not shown) or by a hand crank (not shown).

When the machine is electrically driven the motor is clutched to a pinion 34 (Fig. 3) which drives a gear 35 and pinion 36 secured to a pinion 37 to drive a gear 38 secured to a gear 39 which in turn drives a gear 40 fast to a main cam or drive shaft 41 (Figs. 3, 5, and 15).

For a manual operation the machine is driven by the usual handle (not shown) geared to a large gear 42 (Fig. 15) which meshes with a gear 43 fast to the main shaft 41 mounted in the frames 30 and 31.

The mountings of the above drive gears and pinions are as follows. The pinion 34 and gear 35 are supported on studs 44 and 45 respectively carried by the frame 32. The pinions 36 and 37 are carried by a bearing 46 in the frame 32. Gears 38 and 39 are secured to a shaft 47 mounted in the frames 31 and 32.

Figure 2:
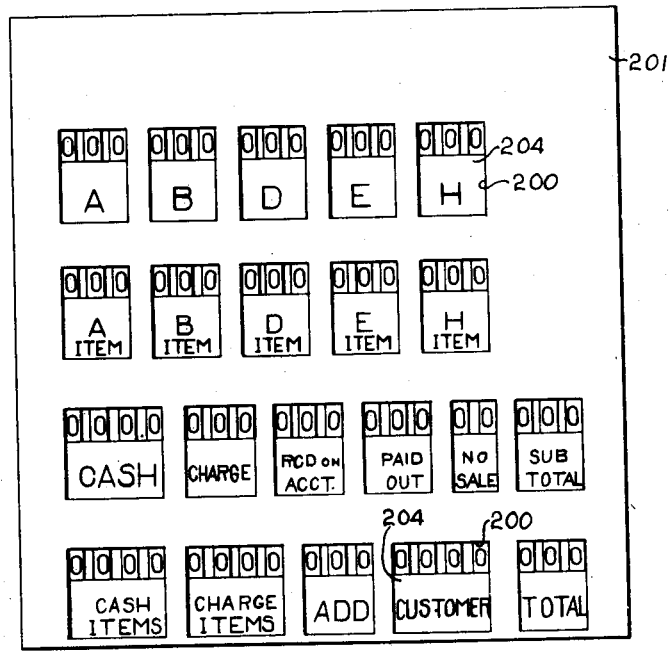
Fig. 2 is a view showing the arrangement of the various groups of special counters.

The machine is encased in a cabinet 48 (Fig. 5) having suitable openings provided with the usual doors or lids (not shown) to protect all the mechanisms and to prevent unauthorized access to such mechanisms. A special portion of the cabinet is shown in Figs. 2 and 17, covering the special counters and it will be later described in connection therewith.

Keyboard

The keyboard of the machine illustrated includes a plurality of banks of amount keys 50 and a plurality of banks of control keys 51, 52 and 53, shown diagrammatically in Fig. 1. The keys 52 and 53 are multiple item transaction keys and single item transaction keys, respectively, while the keys 51 are clerks' keys. The amount keys 50 as shown in the above mentioned Shipley Patent 1,865,147 differentially control the totalizer actuators to add amounts into the totalizers corresponding to the value of the amount keys depressed, while the control keys 51, 52 and 53 control the differential selection of the totalizers according to the classification of the transaction set up on the amount keys. Inasmuch as these particular functions of the keys do not enter into the present invention, no detailed description thereof will be given herein, as reference may be made to the above mentioned patent for the same.

In addition to the function of controlling the differential selection of the totalizers into which the amounts set up on the amount keys are to be added, the control keys 51, 52 and 53 control the differential selection of special counters for the purpose of recording various kinds of data relating to the registrations performed on the machine. Instead of each control key individually selecting a counter for operation as heretofore provided in such types of machines, the present invention provides means controlled by anyone of the clerks' keys 51 in combination with anyone of the transaction keys 52 or 53 for differentially selecting the counters for operation. Although the present invention provides for the depression of only a fixed number of said control keys, namely, a clerk's key 51 in combination with a transaction key 52 or 53, a variable number of special counters are thereby selected for operation. In addition, the same counter may be selected for operation when different combinations of keys are depressed. The means for accomplishing the above will be hereinafter described in detail.

The usual type of total taking mechanism is provided which includes a total lever 54 having several positions of adjustment for conditioning the machine for adding operations and total and sub-total taking operations. The present invention provides means, under control of said total lever, for superseding the control exercised by the depressed control keys in the selection of counters and to select different counters when said lever is moved to its item total taking position. The purpose of this arrangement is, in the case of multiple item transactions, to select certain counters for operation when registering each of the items and to select different counters for operation when taking the total of the same. The means for accomplishing this result will be described more in detail hereinafter.

A motor bar (not shown) is provided for releasing the machine for operation. This bar and the mechanism controlled thereby for releasing the machine for operation are old and well known in the art, as shown in the above mentioned patent, and no description thereof is given herein.

Transaction bank

The construction of the transaction key bank and the differential mechanism associated therewith, as used in this machine, are substantially the same as that shown and described in the Shipley Patent No. 1,865,147, heretofore referred to, and therefore only a brief description thereof will be given herein.

The keys 52 and 53 (Fig. 5) are carried by a usual key frame 60 supported on rods 61 and 62 carried by the frames 30 and 31. There is provided the usual locking detent 63 and control bar 64 which function as described in said Shipley patent.

Clerks' bank

The clerks' keys 51 (Fig. 3) are carried by a usual frame 65 supported on the rod 61 and a rod 66 carried by the frames 31 and 32.

Transaction differential

The keys 52 and 53 (Fig. 5) when depressed serve as stops for controlling the operation of a latch 80 carried by a differential arm 81. A driver 82 is driven from a pair of cams 83 and 84 fast on the main drive shaft by a Y-shaped lever 85 and a link 86. The driver 82 through the latch 80, drives the differential member arm 81 clockwise until the depressed key stops the latch 80 thereby disconnecting the same from the driver 82 to differentially position the arm 81.

Pivoted to the differential arm 81 is a beam 87 bifurcated to engage a stud 88 on a link 89. The beam is positioned differentially in accordance with the position of the differential arm 81 in a manner fully set forth in said Shipley patent. The beam 87 thus positions the link 89 accordingly.

The link 89 (Figs. 5 and 9) is pivoted at its lower end to an arm 90 fast to a sleeve 91 loosely mounted on a shaft 92 supported by the side frames 30 and 31. Secured to the sleeve 91 is a gear segment 94 meshing with a gear segment 95 carried by a rod 96 (Fig. 9) supported by the left side 31 and the printer frame 32 (not shown in Fig. 9). The segment 95 meshes with a gear 97 (Fig. 9) loose on a shaft 98 and clutched to a sleeve 99. The shaft 98 is supported by the frame 31 and an auxiliary frame 93. The sleeve 99 is also clutched to a gear 100 mounted on the shaft 98. The gear 100 meshes with a wide idler gear 101 (Figs. 8 and 9) loose on a shaft 102, which latter gear meshes with a gear 103 secured to a shaft 104. The functions of the shafts 102 and 103 will be later described.

It is thus apparent that depression of anyone of the keys 52 or 53 will, through the link 89 and the train of gearing above described, cause the shaft 104 to be rotated to a position corresponding to the key depressed. If no key is depressed, the shaft 104 is rotated to a position corresponding to the zero position in the transaction key bank.

During the counter-clockwise movement of the driver 82 in returning to its home position a surface 105 thereon coacts with a stud 106 on the differential arm 81 to return the latter to its normal position in the usual manner.

CLERKS' DIFFERENTIAL

The lower ends of the clerks' keys (Fig. 3) when depressed are adapted to cooperate with a nose 120 of a differential control arm 121 loose on a stud 119 in the frame 31 and stop said arm in a position corresponding to the key depressed. The arm 121 is connected by a link 122 to a latch lever 123 loose on a shaft 124. This lever 123 carries a stud 125 connected to a latch 126 pivoted at 127 on a latch plate 128 which in turn is pivoted on the shaft 124. A spring 129 connects the latch plate 128 to the latch 126 and urges the latch counter-clockwise to normally maintain a foot 130 thereof in front of a driving shoulder 131 of a driver 132 pivoted on the shaft 124. The driver 132 has a control arm 133 connected by a link 134 to a cam lever 135 pivoted at 136 on the frame 31. A roller 137 on the cam lever 135 cooperates with the race of a cam disk 139 secured to a shaft 140.

In adding operations the shaft 140 is given one clockwise movement and in total taking operations the shaft is given two clockwise rotations by means of a gear 141 secured to the shaft 140 which meshes with the gear 142 which in turn is driven by the previously described gear 39. This gear 39 as above mentioned may be driven either by motor from the gear 34 or by hand from the gear 40.

On clockwise rotation of the shaft 140 the arm 133 and driver 132 are rocked counter-clockwise and through the latch 126 rocks the lever 123 counter-clockwise which through the link 122 drives the differential arm 121 clockwise until the nose 120 thereof strikes the corresponding depressed key 51 thus stopping said arm 121 and lever 123 whereupon the latch 126 is disengaged from the driver 132 and a nose 143 of the latch engages one of a series of aligning notches 144 in a plate 145. The notch 144 engaged being the one opposite the nose at the time of disengagement of the latch from the driver 132.

Pivoted at 150 to the differential latch plate 128 is a beam 151 the other end of which is, through a pin and slot, connected to a link 152 which link is also connected to a lever 153 pivoted on the stud 119. Connected to the lever 153 (Fig. 4) by a link 154 is a gear segment 155 meshing with a pinion 156 secured to the previously described shaft 98.

Secured to the other end of the shaft 98 is a pinion 157 (Figs. 6 and 9) meshing with a pinion 158 secured to the previously mentioned shaft 102 and for a purpose to be hereinafter described.

As the latch plate 128 is differentially positioned under control of the clerks' key 51 the upper end of the beam 151 is likewise positioned and during the operation of the machine a roller 159 (Fig. 3) contacts the underside of the beam and rocks the same about its pivot 150 to differentially position the lever 153 and gear segment 155 which in turn through pinions 156, 157, and 158 differentially position the shaft 102 according to the differential position of the arm 121 under control of the clerks' key which has been depressed.

The purpose of this differential positioning will be hereinafter explained in detail in connection with the selection of the special counters.

The driver 132 is returned to its normal positon by the cam race 138 at each operation of the machine, lower end of the beam 151 as is usual being left in the position in which it was differentially set.

When the driver 132 is returned to its home position a shoulder 160 thereon contacts a stud 161 on the differential latch plate 128 and returns said plate to its normal position.

If none of the clerks' keys 51 is depressed a projection 162 of the differential arm 121 contacts a stationary stud 163 in the frame 31 to stop the arm in a blank position thus causing the differential mechanism to be controlled accordingly.

TOTAL CONTROL LEVER

The present machine as previously stated is provided with usual total control lever 54 (Figs. 1 and 14) and its usual associated mechanism. This lever and said mechanism are constructed and operate in the same manner as that shown and described in the above mentioned Shipley Patent, No. 1,865,147.

In the present application the total lever in addition to performing its usual function of conditioning the machine for single cycle and two cycle operations performs the additional functions of shifting the shaft 104 (Figs. 7, 8, and 9) longitudinally to effect the selection of special counters different from that made under control of the keys 51, 52, and 53, and adjusts means for controlling the selection of the "sub-total" and "total" special counters.

The total lever 54 is normally in "add" position shown in Figs. 1 and 14 and as usual is manually moved upwardly for conditioning the machine for sub-total operations and downwardly for total taking operations. When the lever 54 is moved either upwardly or downwardly out of its normal "add" position a slot 170 by means of a pin 171 rocks the usual levers 172 and 173 which in turn rock an arm 174 and a shaft 175 to which it is secured in a clockwise direction. This clockwise movement of the shaft 175 (Fig. 15) by means of an arm 176, link 177, and lever 178 moves a pitman 179 to the left to operate a coupling slide 180 to couple a cam 181 with the gear 42 whereby said cam is operated with the gear during total and sub-total operations to operate a link 182 connected to a key lock and release shaft 183 to control the operation thereof by an arm 184 to control the release of the keys at the proper time during total and sub-total operation as is fully illustrated and described in the above mentioned Shipley Patent No. 1,865,147.

Also secured to the shaft 175 (Figs. 7 and 9) is an arm 185 carrying a stud 186 embraced by a bifurcated arm 187 secured to a shaft 188 carried by special counter side frames 189 and 190. The frame 189 has two feet 191 (Figs. 6 and 7) by means of which it may be screwed to be base 33. The frame 190 is secured to the end of the base 33 by screws 192 (Fig. 17).

Secured to this shaft 188 are two oppositely faced cam arms 193 and 194 which cam arms cooperate with the ends of the shaft 104, which is also supported by the frames 189 and 190. The initial movement of the shaft 175 through the arms 185 and 187 rocks the cam arms 193 and 194 to shift the shaft 104 to the right as viewed in Figs. 8 and 9 for a purpose to be hereinafter described in connection with the selection of the special counters.

The further movement which the shaft 175 and consequently the cam arms 193 and 194 receives during total and sub-total operations has no effect upon the shaft 104 because the complete shifting movement necessary for this shaft is fully accomplished during the initial movement of the total lever 54 from its "add" position into any of its total or sub-total positions.

The total lever 54 (Fig. 14) has pivoted thereto a link 195 connected to an arm 196 secured to the previously described shaft 92. Also secured to this shaft 92 is an arm 197 (Fig. 10).

When the total lever is moved upwardly above its "add" position in the usual manner, it conditions the machine for taking sub-total operations and when moved downwardly below its usual position it conditions the machine in the usual manner for total taking operations. When the lever is moved upwardly the shaft 92 and arm 197 are rocked in a counter-clockwise direction as viewed in Figs. 10, 12, and 14 to control means to select a sub-total special counter for operation and when the lever 54 is moved downwardly the shaft 92 and the arm 197 are rocked clockwise to select a total special counter for operation.

The means controlled by the total lever 54 and the means just described for selecting the total and sub-total special counters will be hereinafter described in connection with the special counter selecting mechanism.

*Totalizers and actuators*

The machine disclosed in this application includes the usual totalizers, actuators therefor, and amount keys, none of which are shown herein but which are shown and described in the above mentioned Shipley Patent No. 1,865,147. Such usual amount keys differentially control said actuators to add amounts into the totalizers corresponding to the value of the amount keys depressed. The clerks and transaction control keys control the differential selection of the totalizers by their above described differential mechanisms. Since all of these devices are shown and described in the above mentioned patent and as they form no pertinent part of the present invention, they are not shown or described in detail here.

*Special counters*

The present machine is provided with twenty-one special counters (Fig. 2), arranged in four rows or groups, each row including five counters except one row which has six counters. These rows of counters are disposed in parallel relation with one another in front of the keyboard of the machine.

One row comprises individual clerks' counters, each counter being designated by one of the clerks' letters "A," "B," "D," "E" and "H" corresponding to the clerks' keys bearing the same characters, for adding the number of transactions entered into the machine by each of the clerks.

Another row includes individual clerks' item counters, designated as "A item," "B item," "D item," "E item" and "H item," for adding the number of items comprising the various transactions entered into the machine by each clerk.

Another row includes "Cash," "Charge," "Rec'd. on acc't," "Paid out," "No sale," and "Sub-total" counters. These counters each add the total number of transactions of each of the classes above indicated which are entered into the machine by all of the clerks. For example, the cash transactions entered into the machine by each of the clerks will be added into the "Cash" counter.

The remaining row comprises "Cash items," "Charge items," "Add," "Customer" and "Total" counters. The "Cash items" counter adds the number of items comprising all of the cash transactions entered into the machine by the various clerks, while the "Charge items" counter adds the number of items comprising all of the charge transactions entered into the machine by the various clerks. The "Add" counter adds the number of times that the machine is used for adding operations during which no entry is made into any of the classification totalizers. The "Customer" counter adds the total number of complete transactions entered into the machine by all of the clerks, but does not add when the "Add" key is depressed. The "Total" counter adds the number of times that total taking operations are performed on the machine. The "Sub-total" counter adds the number of times a sub-total operation is performed.

The counters are visible for reading purposes through openings 200 (Fig. 2) in a protecting cover 201 which cover has an integral plate 202 (Fig. 17) protecting the front part of the counter assemblies. A transparent plate 203 lies underneath the cover 201 to prevent unauthorized manipulation of said counters. The counter names and designations are on strips 204 (Fig. 2) beneath the plate 203. The cover 201 and plate 202 are secured to the frames 189 and 190.

The rows of counters, in the order above enumerated, are supported on shafts 210, 211, 212, and 213 respectively, (Fig. 6), which shafts are journaled at their ends in frames 214, 215, 216 and 217 respectively, mounted in side plates 189 and 190, (Figs. 10 and 17).

The construction and operation of the special counters herein referred to are old and well known in the art, as illustrated in the Fuller Patent No. 1,394,256, and therefore only a brief description thereof will be given. Since all of said counters are alike in construction except for the number of wheels, some having three wheels and some having four wheels, a detailed description of one will suffice for all.

A detailed description of the "Sub-total" counter (Fig. 10) will be given as exemplary of all of said counters. This counter includes a plurality of number wheels 220, each having secured thereto a ratchet 221, mounted on the shaft 212. Also mounted on the shaft 212 is a yoke 222 carrying a spring-actuated pawl 223 mounted on a rod 224 carried by the yoke 222. This pawl is of the usual multi-tined type and coacts with the ratchets 221 to move the wheels 220 one step of movement when the yoke 222 is rocked counter-clockwise during the operation of the counter. A spring-pressed retaining pawl 225 serves to hold the ratchets 221 and wheels 220 in position. Rocking the yoke 222 counter-clockwise and then clockwise back to its normal position to operate the counter is accomplished through the bifurcated end of a lever 226 embracing a rod 227 mounted in the yoke 222. The operating mechanism for the lever 226 will be later described.

The counter-clockwise movement of the yoke 222 causes the pawl 223 to advance the lowest order wheel 220 one step. Each ratchet 221 has a deep notch 228 and as its associated wheel 220 passes from "9" to "0" the tine of the pawl 223 for said wheel enters said notch 228, thus permitting the pawl 223 to be rocked counter-clockwise about the rod 224 whereupon the next higher order pawl-tine turns its associated wheel one step.

*Counter operating means*

Means common to all of the special counters is provided for operating the same. This means includes a plurality of rods 230 (Figs. 6 and 9) connected together by a pair of links 232 and 233 (Fig. 9) to form an actuating frame. There is one rod 230 provided for each row of counters, each of said rods having pivotally mounted thereon the bifurcated levers 226 previously mentioned for actuating the counters associated with each of said rods 230. The levers 226 are laterally spaced by sleeves 234. The two end rods 230 have bearings in slots 231 for the reciprocation of the actuating frame. The actuating frame is reciprocated once during each cycle of operation of the machine by means which will now be described.

The previously described gear 43 (Fig. 12) which it will be recalled is fast on the main drive shaft 41, serves to give the above mentioned actuating frame its reciprocating movement. The gear 43 has a cam groove 235 which coacts with a roller 236 carried by a lever 237 pivotally mounted on a stud 238 on the side frame 30 to rock said lever 237 first counter-clockwise and then clockwise. The lever 237 carries a stud 239 embraced by the bifurcated end of an arm 240 secured to a shaft 241 journaled at its end in the plates 189 and 190. Also secured to the shaft 241 is a pair of arms 242 and 243 (Figs. 6 and 9) which at their upper ends engage studs 244 and 245 carried by the links 232 and 233, respectively.

Counter-clockwise movement of the lever 237 rocks the shaft 241 and arms 242 and 243 clockwise to move the links 232 and 233 and the shafts 230 to the right (Figs. 6, 10, and 12). Now if the lower ends of the levers 226 are held, by means to be hereinafter described, said levers 226 will pivot at their lower ends, below the rods 230, in a clockwise direction upon movement of the links 232 and 233 to the right, thus turning the yokes 222 counter-clockwise whereupon the pawls 223 will actuate their respective special counters.

As the gear 43 nears its normal position the lever 237 and associated train of mechanism above described will be returned to normal position.

*Counter selecting mechanism*

Means is provided in connection with the actuating frame for determining which counters are to be operated by the links 232 and 233 of the actuating frame when the latter receives its reciprocating movement. This means includes a series of horizontal bars 250, one associated with each counter actuating lever 226, pivotally carried beneath the actuating frame by arms 251 loosely mounted on the front and rear rods 230, as shown in Fig. 12. Where such arms 251 (Figs. 6, 9 and 10) coincide with the position of the bifurcated levers 226, the lower portions of such levers are pivoted to said bars 250 used in place of the supporting arms 251.

The levers 226 on the intermediate rods 230 are each pivotally connected at their lower ends to their respective bars 250. Each bar 250 has a projection 252 carrying a stud 253.

Associated with each bar 250 is a feeling lever 254 pivotally mounted on a rod 255 (Figs. 6, 10, 12 and 13) supported at its ends in a pair of levers 256 and 257, the latter being pivotally mounted on a shaft 258 journaled in the frames 189 and 190. The forward ends of the levers 254 are normally positioned in the path of the studs 253 and thereby block any movement of their associated bars 250 with the actuating frame. The levers 254 are adapted to be moved out of blocking relation with the studs 253 by the counter selecting disks to be hereinafter described. When said levers 254 are moved out of blocking relation with the studs 253, the bars 250 are allowed to move with the actuating frame, thus causing the counter operating levers 226 to pivot idly about the rods 224 of the counter actuating yokes 222 without actuating the counters.

If any of the levers 254 are not moved out of their blocking position relative to the studs 253, the bars 250 associated therewith are prevented from moving with the counter actuating frame and the levers 226 associated with those particular levers 254 will be held at their lower points and caused to pivot about said points to actuate the counters associated therewith in the manner above described.

A rod 259 (Figs. 6, 10 and 12) carried by the frames 189 and 190 acts a forward stop for the bars 250 and associated mechanism.

As heretofore mentioned, all of the counters in the present machine, except the "Total" and "Sub-total" counters, are differentially selected under control of the clerks' bank of keys 51 in conjunction with the transaction bank of keys 52 and 53. During the entry into the machine of items of a multiple item transaction, the counters are differentially selected under control of the clerks' keys 51 in combination with the multiple item keys 52. In taking the total of said multiple item transaction, the total lever 54, when moved to its item total taking position, supersedes the control exercised by said control keys in the selection of the counters and effects a different selection of counters. This selection of the counters, both by the control keys 51, 52 and 53 and the total lever 54, is effected by means of a series of notched disks under control of said keys and total lever, which will now be described.

Associated with the clerks' bank of keys 51 is the previously described shaft 102 having fast thereon ten disks 270 to 279 (Figs. 8, 9 and 16) inclusive, while associated with the transaction bank of keys 52 and 53 is the previously described shaft 104 having fast thereon the nineteen pairs of disks, of which the pairs of disks 280, 281 and 282, 283, are exemplary.

Each of said pairs of disks on the shaft 104 is associated with one of the special counters, while each one of the disks 270 to 279 on the shaft 102 cooperates with one of said pairs of disks on the shaft 104 to control the selection of the counters associated therewith. Inasmuch as there are nineteen pairs of disks on the shaft 104 and only ten disks on the shaft 102, there will be only ten of said pairs of disks, of which the pair of disks 280 and 281 is representative, which have associated therewith one of the disks 270 to 279. The other nine pairs of disks of which the pair of disks 282 and 283 is representative, have no associated disks on the shaft 102 and, therefore, each of said nine pairs of disks is adapted alone to control the selection of its respective counter.

In other words, there are two methods employed in the present machine for controlling the selection of the above mentioned counters through the medium of notched disks, namely, one method employing three disks to select a counter, and another method employing only two disks to select a counter. It will be understood, however, that there can be provided on the shaft 102 an associate disk for each pair of disks on the shaft 104 if it is so desired, and as many pairs of disks may be provided on the shaft 104 as the number of counters it is desired to have in the machine. It is only for the purpose of illustration that the present arrangement of disks is employed herein.

Since the selection of all of the counters, except the "Total" and "Sub-total" counters, is controlled by either the method employing three notched disks or the other method employing only a pair of notched disks, it is thought that a description of each of said methods as applied to one of the counters in connection with which it is used will suffice for all of the other counters.

The right-hand disk of each pair of disks on the shaft 104 (Figs. 8 and 9) of which disks 280 and 282 are representative, is normally in effective position for controlling the selection of the counters associated therewith during adding operations. The other one or left-hand disk of each of said pairs of disks, of which the disks 281 and 283 are representative, is normally in ineffective position. In taking a total of a multiple item transaction, the total lever 54, when moved to its item total taking position, shifts the shaft 104 to the right as heretofore explained, thereby moving the pairs of disks so that the right-hand disk of each pair is out of effective position and the left-hand disk of each of said pairs is in effective position.

The shaft 102, on which the disks 270 to 279 are secured, unlike the shaft 104, is not adapted to be shifted laterally, consequently the disks thereon are always in effective position. As above mentioned, each one of the disks 270 to 279 is always in cooperative relation with either one or the other of the disks of its associated pair of disks, of which the pair of disks 280 and 281 is representative, depending upon which one of the disks comprising each of said pairs of disks is in effective position. Thus, the right-hand disk of each of said pairs of disks, of which the disk 280 is representative, being normally in effective position, cooperates with its associated one of the disks 270 to 279 to control the selection of its corresponding counter during adding operations. On the other hand, when the shaft 104 and the pairs of disks thereon are shifted laterally to the right, when the total lever 54 is moved to its item total taking position, said right-hand disk of each of said pairs of disks is thereby moved out of effective position and consequently out of cooperative relation with its associated one of the disks 270 to 279, while the left-hand disk, of which disk 281 is representative, of each of said pairs of disks is moved into effective position to cooperate with its associated one of the disks 270 to 279 to control the selection of its corresponding counter during such item total taking operation.

Each of the above mentioned disks on the shafts 104 and 102 are variously notched to correspond to the positions to which said disks and said shafts are adapted to be rotatably adjusted under control of the clerks' keys 51 and the transaction keys 52 and 53. When the disks, of which the pair of disks 280 and 281 is representative, are rotatably adjusted so that the notched portions thereof are in effective selecting position, and the corresponding disks 270 to 279 are likewise adjusted so that their notched portions are in effective selecting position, then the corresponding disks on the two shafts 104 and 102 will cooperate with each other to effect the selection of the counters associated therewith. Where the pairs of disks, on the shaft 104 of which the pair of disks 282 and 283 is representative, have no associated disks on the shaft 102 then said pairs of disks will alone effect the selection of their corresponding counters when said disks are in effective positions and the notched portions thereof are also in effective positions.

The means cooperating with the above mentioned disks in controlling the selection of the counters will now be described. Each of the feeling levers 254 (Figs. 6, 9 and 16) previously described herein, cooperates with one of the pairs of disks, of which the pairs of disks 280 and 281 and 282 and 283 are representative. Where said pairs of disks, such as the pair of disks 280 and 281 have associated therewith the disks 270 to 279 on the shaft 102, then the levers 254 associated with those particular pairs of disks will also cooperate with said associated disks 270 to 279 to effect the selection of the counters corresponding thereto. Each of the levers 254 has formed thereon a pair of feeling projections 284 and 285 which are adapted to coact with the disks on the shaft 104 and the disks on the shaft 102, respectively, to determine which counters are to be operated. Where there is no associated disk on the shaft 102 with which the projection 285 on any of the levers 254 can coact, then said lever is controlled solely through the projection 284 thereon coacting with its associated disks on the shaft 104.

Springs 286 (Fig. 6) normally hold the levers 254 against rods 287 and 288 so that the forward ends of said levers are in the paths of movement of the studs 259 and the projections 284 and 285 thereon out of cooperative relation with the disks on the shafts 104 and 102. The rods 287 and 288 are carried by frames 189 and 190 and are grooved to guide the levers 254 (Fig. 13). The springs 286 are connected to a rod 289 carried by a pair of levers 290 and 291 pivotally mounted on a rod 292 journaled at its ends in the frames 189 and 190. The forward ends of the levers 290 and 291 are connected to the forward ends of the levers 256 and 257 by links 293 and 294 respectively.

During each cycle of operation of the machine, the levers 254 (Fig. 6) are raised at their rear ends to bring the projections 284 and 285 into cooperative relation with their associated disks on the shafts 104 and 102. If the projections 284 and 285 on any of the levers 254 coact with the unnotched portions of any of their associated disks, those particular levers will not select their associated counters for operation. On the other hand, if the projections 284 and 285 on any of the levers 254 coact with the notched portions of their associated disks, those particular levers will thereby select their associated counters for operation. The means for accomplishing this result will now be described.

During each single cycle of operation of the machine, the shaft 258 (Fig. 12) is rocked first counter-clockwise and then clockwise by a roller 295, carried by the forward end of the lever 237 coacting with a cam slot 296 in an arm 297 secured to the shaft 258. The shaft 258 when moved counter-clockwise, causes, through levers 256 and 257, the rod 255 to be moved upwardly. This causes the levers 254 pivotally mounted on the rod 255 to be raised at their rear ends to bring the projections 284 and 285 into cooperative relation with the disks associated therewith. The initial movement of the levers 254 is a pivotal movement about the rod 287 due to their being held at their forward ends against the rod 287 by the springs 286.

If the projections 284 and 285 on any of the levers 254 coact with the unnotched portions of any of their associated disks, the rear ends of said levers will thereby be blocked against further upward movement, thus causing said levers to pivot about the rod 255, against the tension of the springs 286, to raise the forward ends of said levers out of the paths of movement of the studs 253 associated therewith. This, as heretofore explained, permits the bars 250 associated with said levers 254 to move with the counter actuating frame, thus links 232 and 233 causing the counter operating levers 226 associated with said bars 250 to pivot idly about the rods 227 of the counter actuating yokes 222 without actuating the counters associated therewith.

If on the other hand, the projections 284 and 285 on any of the levers 254 engage the notched portions of their associated disks, the rear ends of said levers will thereby be allowed to move further upwardly, thus causing said levers to pivot about the rod 287 without raising the forward ends of said levers from the paths of the studs 253 associated therewith. This will prevent the bars 250 associated therewith from moving with the actuating frame, thus causing the levers 226 associated with said bars 250 to pivot at their lower ends and operate their yokes 222 to actuate their respective counters.

Figure 16:
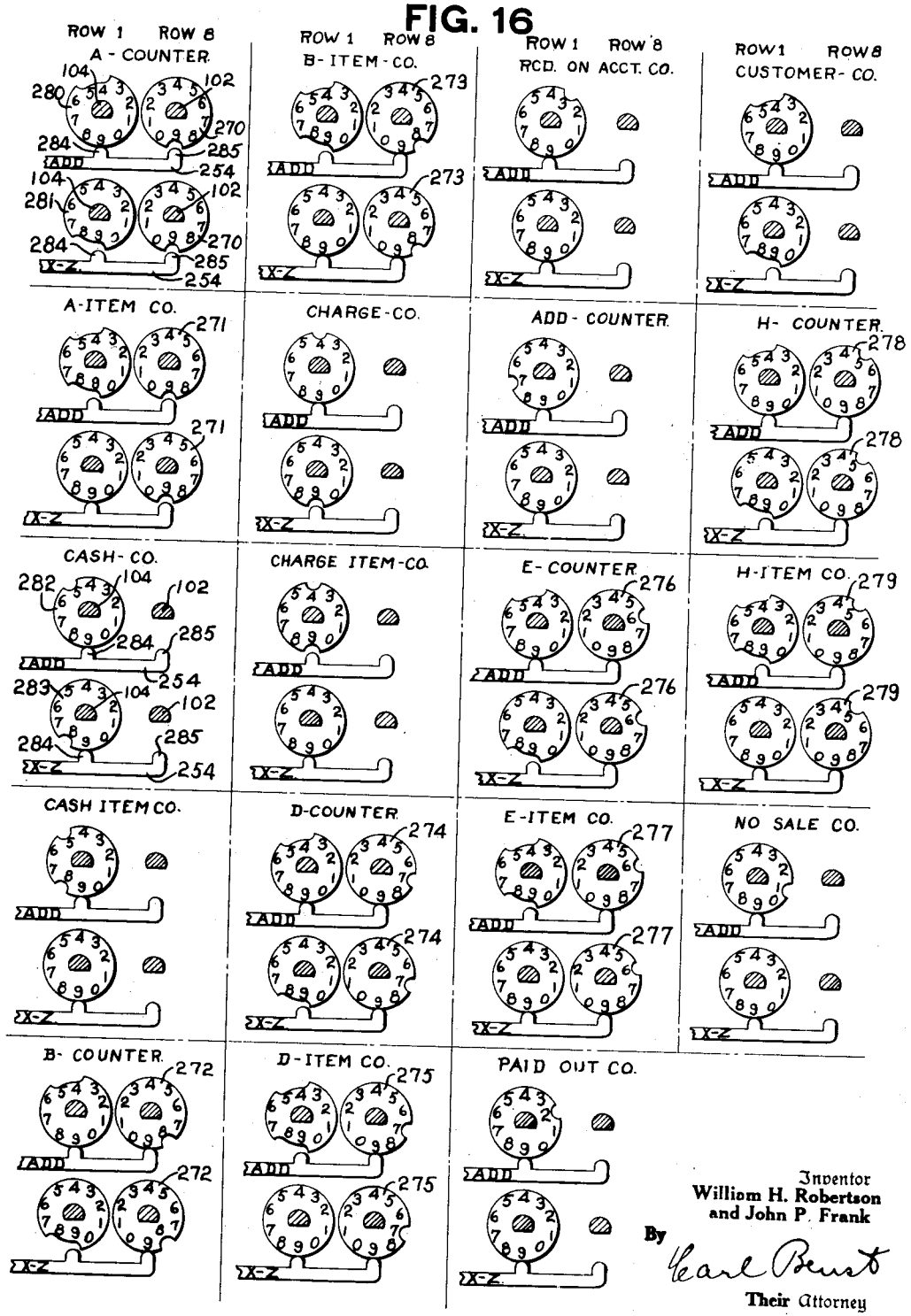
Fig. 16 is a diagrammatic view showing the disks associated with each of said counters, and the positions which they assume when the clerk "A" key and the transaction "Item charge" key are depressed.

Fig. 16, which shows the positions which all of the above mentioned disks assume when the clerk "A" key 51 and the transaction "Item charge" key 52 are depressed, illustrates the scheme for using said notched disks to control the selection of all of the counters, except the "Total" and "Sub-total" counters which will be hereinafter described. The selection of the counters referred to in this figure falls into two classes, one class including the "A," "A item," "B," "B item," "D," "D item," "E," "E item," "H," and "H item" counters, which counters are identified with the individual clerks; while the other class includes the "Cash," "Cash item," "Charge," "Charge item," "Rec'd. on acc't," "Add," "Paid out," "Customer" and "No sale" counters, which are identified with all the clerks in general. The selection of each of the counters in the first of the above named classes is controlled by a pair of disks, of which the pair of disks 280 and 281 is representative, in cooperation with an associated one of the disks 270 to 279. The selection of each of the counters in the second of the above named classes is controlled solely by a pair of disks on the shaft 104 of which the pair of disks 282 and 283 is representative.

Referring to Fig. 16, in the upper left-hand section designated "A-counter," the top pair of disks appearing therein consists of the disk 280 and its associated disk 270. These two disks normally cooperate with each other in controlling the selection of the "A" counter during adding operations. Since these disks are shown in the positions they assume when the clerk "A" key 51 and the transaction "Item charge" key 52 are depressed, which conditions the machine for a multiple item transaction, they will prevent selection of the "A" counter during the entry of each of said multiple items into the machine, as said "A" counter only adds the number of complete transactions entered into the machine by the clerk "A." Said counter is prevented from being selected by the projection 284 on the lever 254 associated therewith coacting with the unnotched portion of the disk 280, as is apparent from said figure.

In the lower half of the above mentioned square, the disk 281 is shown in its shifted position where it cooperates with the disk 270 to control the selection of the "A" counter during the item total taking operation. In taking the total of said multiple item transaction, the total lever 54, when moved to its total taking position, shifts the shaft 104 and disks thereon to the right, as heretofore explained, thus moving the disk 280 out of cooperative relation with the disk 270 and, at the same time, moving the disk 281 into cooperative relation with the disk 270, as shown in the lower half of said square, to control the selection of the "A" counter during said item total taking operation. The "A" counter will be selected during said operation through the projections 284 and 285 on the lever 254 coacting with the notched portions of both of the disks 281 and 270, as shown in said figure.

It will thus be observed from the above description that three notched disks, namely, the pair of disks 280 and 281 in cooperation with the disk 270, are employed to control the selection of the "A" counter. Therefore, each of all of the other counters falling in the same class as the "A" counter will employ a like number of notched disks in a similar manner to control its selection. It is therefore, felt that the description of the means for controlling the selection of the "A" counter will suffice for all of the other counters in the same class.

Referring to the center square in the first column on the left in Fig. 16, designated "Cash-co.", the upper disk 282 and the lower disk 283 shown therein comprises the pair of disks on the shaft 104 which control the selection of the "Cash" counter. It will be noticed that this pair of disks is shown as having no associated disk on the shaft 102, as was shown in connection with the "A" counter above described. Consequently, the pair of disks 282 and 283 will alone control the selection of the "Cash" counter. The disk 282 is normally in effective position to control the selection of the "Cash" counter during adding operations.

Since Fig. 16 shows all of the disks in the positions which they assume when the clerk "A" key 51 and the transaction "Charge item" key 52 are depressed, thereby conditioning the machine for a multiple item charge transaction, it will be apparent therefrom that the disk 282 will prevent selection of the "Cash" counter during the adding of the items into the machine, as said counter is adapted to only add the complete cash transactions entered into the machine by all of the clerks. Said counter is prevented from being selected by the projection 284 on the lever 254 associated therewith coacting with the unnotched portion of the disk 282, as will be seen in Fig. 16.

In the lower half of said square, directly below the disk 282, the disk 283 is shown shifted to its effective position for controlling the selection of the "Cash" counter during item total taking operations. In taking the total of said multiple item transaction, the total lever 54, when moved to its total taking position, shifts the shaft 104 and disks thereon to the right, as previously explained, thus moving the disk 282 out of effective position and, at the same time, moving the disk 283 into effective position to control the selection of the "Cash" counter during said total taking operation.

Since the transaction is a multiple item charge transaction and not a cash transaction, the "Cash" counter will be prevented from being selected by the disk 283 in the same manner as previously described in connection with the disk 282. In other words, the projection 284 on the lever 254 associated with said pair of disks will coact with the unnotched portion of the disk 283, as seen in Fig. 16.

From the above it will be apparent that only two notched disks, namely, the pair of disks 282 and 283, are employed to control the selection of the "Cash" counter. It is, therefore, felt that the description of the means for controlling the selection of the "Cash" counter will suffice for all of the other counters falling in the same class as said "Cash" counter.

*Selecting means for "Total" and "Sub-total" Counters*

The means for controlling the selection of the "Total" and "Sub-total" counters is different from that used for controlling the selection of the other special counters in the machine. The selection of these two counters is effected by a pair of control plates 300 and 301 (Figs. 10, 11, and 12) pinned together and loosely mounted on a stud 302 carried by the frame 30. The plate 300 controls the selection of the "Total" counter, while the plate 301 controls the selection of the "Sub-total" counter.

Associated with the plates 300 and 301 are feeling levers 303 and 304 respectively. The lever 303 has a projection 305 and a laterally projecting stud 306, while the lever 304 has a projection 307 and a laterally projecting stud 308. The levers 303 and 304 are arranged and constructed similar to the levers 254 previously described, the only difference being that the levers 303 and 304 have studs 306 and 308 in place of the projections 285.

The plate 300 has an opening 309 having a notch 310 in the upper wall thereof, while the plate 301 has an opening 311 having a notch 312 in the upper wall thereof. The stud 306 projects through and works in the opening 309 in the plate 300 while the stud 308 projects through and works in the opening 311 in the plate 301. The levers 303 and 304 are pivotally mounted on the rod 255 and are operated by the same means and in the same manner as the lever 254, heretofore described.

The studs 306 and 308 normally bear against the upper walls of the openings 310 and 311 respectively, and thereby prevent any upward movement of the rear ends of the levers 303 and 304 during an adding operation of the machine. With the rear ends of the levers 303 and 304 thus held against upward movement, said levers will pivot about the rod 255 against the tension of the springs 286 and the forward ends of said levers will thereby be moved out of the path of movement of the studs 253 associated therewith. This permits their associated bars 250 to move with the actuating frame, thus causing the counter operating levers 226 associated with the "Total" and "Sub-total" counters to pivot idly about the rods 227 in a manner heretofore described, without operating said counters.

The manner in which the "Total" and "Sub-total" counters are selected for operation will now be described. When the plates 300 and 301 are positioned so that the notches 310 and 311 are directly over the studs 306 and 308, the rear ends of the levers 303 and 304 are, through the studs 306 and 308 engaging the notches 310 and 311, respectively, permitted to raise during an operation of the machine. When the rear ends of the levers 303 and 304 are thus raised, said levers will pivot about the rod 287 and the forward ends of said levers will not be removed from the paths of the studs 253 associated therewith. This prevents the bars 250 associated therewith from moving with the actuating frame, thus causing the levers 226 associated with the "Total" and "Sub-total" counters to pivot at their lower ends to rock the yokes 222 and thereby actuate said counters.

The positioning of the plates 300 and 301 is effected by the shaft 92 which as previously explained is controlled by the total lever 54 (Fig. 14). The shaft 92 (Figs. 10 and 12) as previously stated has secured thereto the arm 197 which carries a stud 321. During adding operations, the stud 321 normally engages a notch 322 formed in a setting lever 323 loose on the stud 302. The lever 323 has two cam surfaces 324 and 325 with which the stud 321 coacts when the total lever 54 is moved out of its normal or add position.

When the lever 54 is moved downwardly to its total taking position it causes the shaft 92 to be rotated in a clockwise direction, thus rocking the arm 197 clockwise to move the stud 321 out of the notch 322 and cause it to coact with the cam surface 324 to rock the lever 323 counterclockwise. When the lever 54 is moved upwardly to its sub-total taking position it causes, through the same train of mechanism just described, the stud 321 to coact with the surface 325 and rock the lever 323 clockwise.

The lever 323 has stop arms 326 and 327 (Fig. 10) which coact with a stud 328 carried by the frame 190 to limit the counter-clockwise and clockwise movements which the lever 323 receives through the stud 321.

The lever 323 is connected to the plate 301 by means of a point on a pawl 329 engaging one of three notches 330 in the lower portion of the plate 301. The pawl 329 is pivotally mounted at 332 on the lever 323 and is constantly urged clockwise into engagement with one of the notches 330 by a spring 333 connected to a projection 334 on the pawl 329 and to the arm 327. The pawl 329 is normally in engagement with the middle one of the notches 330.

From this it is apparent that when the lever 323 is rocked either counter-clockwise or clockwise, the plates 301 and 300 are, through the pawl 329 connection, moved therewith. When the lever 323 is rocked counter-clockwise the plate 300 is positioned so that its notch 310 is in a position to be engaged by the stud 306 to effect the selection of the "total" counter for operation. Clockwise movement of the lever 323 positions the plate 301 so that its notch 312 can be engaged by the stud 308 to effect selection of the "Sub-total" counter for operation.

It will be recalled that in total taking and sub-total taking operations the machine receives two cycles of operation. To prevent the "Total" and "Sub-total" counters from being selected and operated twice during a two-cycle operation, that is to say, once during each cycle of such operation, means is provided for preventing selection of said counters during the second cycle of such operation. This means consists of a lever 340 (Figs. 9, 10 and 11) pivotally mounted on a stud 341 carried by the frame 30. The lever 340 is rocked in a clockwise direction once during each cycle of operation by a disk 342 pinned to the main drive shaft 41. The shaft 41 and disk 342 receive one complete revolution in a clockwise direction during each cycle of operation of the machine.

Near the end of such clockwise revolution, a stud 343 carried by the disk 342 strikes a nose 344 on the lever 340 and cams said lever clockwise until the stud 343 clears the nose 344, when said lever returns to its normal position by action of gravity. The lever 340 is held in its normal position by the forward end of said lever resting on a stud 345 carried by the frame 190.

When the lever 340 is rocked clockwise in the manner just described, a toe 346 (Fig. 11) thereof coacts with one or the other of two cam surfaces 347 or 348 on the plate 300 to rock said plate and the plate 301 back to their normal ineffective positions near the end of the first cycle of the two cycle operation. When the plate 301 is thus moved, the pawl 329 is cammed out of the middle one of the notches 330 and into the next notch on either side thereof, depending upon which direction the plates 300 and 301 are rocked by the lever 340, to return said plates to their normal ineffective positions. In this manner the plates 300 and 301 are held during the second cycle of such operation in the ineffective positions to which they have been moved by the lever 340, while the lever 323 remains in the position to which it was moved by the total lever 54. From this it can be seen that the "Total" and "Sub-total counters will not be selected for operation during the second cycle of a two cycle operation.

When the total lever 54 is returned to its normal or add position, the lever 197 is thereby caused to return the lever 323 to its normal position. The pawl 329, being engaged with either one or the other of the end notches 330, moves the plates 300 and 301 with the lever 323. This moves the plates 300 and 301 out of their normal ineffective positions and into effective selecting position for either the plate 300 or the plate 301, depending upon whether said plates are rocked counter-clockwise or clockwise. The plates 300 and 301 thus remain in such moved position until near the end of the next single cycle or add operation of the machine, when the lever 340 is again rocked clockwise, causing its toe 346 to coact with either one or the other of the cam surfaces 347 or 348 and return the plates 300 and 301 to their normal ineffective positions. During such movement of the plates 300 and 301, the pawl 329 is cammed out of whichever one of the end notches 330 it is engaged and is again engaged with the middle one of said notches 330.

In order to prevent selection of either the "Total" or "Sub-total" counter during the next single cycle or adding operation of the machine, before the plates 300 and 301 are returned to their normal ineffective positions, two unnotched disks 349 and 350 (Figs. 8, 9, 10 and 12) are provided. The disks 349 and 350 are provided with hubs 351 and 352, respectively, which are pinned to the shaft 104. These disks are spaced apart from the main group of disks 280, 281, 282, and 283 and are located near the right-hand end of the shaft 104. The disks 349 and 350 are normally positioned so that the projections 305 and 307 on the levers 303 and 304, respectively, coact therewith during single cycle or adding operations, thereby preventing the rear ends of said levers from being raised sufficiently to effect the selection of the counters associated therewith. When the total lever 54 is moved out of its normal or add position, the shaft 104 is shifted toward the right, as heretofore explained, thereby moving the disks 349 and 350 out of cooperative relationship with the projections 305 and 307, thus leaving the selection of the "Total" and "Sub-total" counters under the sole control of the plates 300 and 301.

Means is also provided for preventing during the second cycle of a two cycle operation the selection and operation of the counters, except the "Total" and "Sub-total" counters which are effected in the same way but by different mechanism heretofore described. This means consists of a blocking bail 360 (Figs. 6 and 9) arranged parallel with and interposed between the two shafts 102 and 104, the lower edge of said bail being disposed directly over the rear ends of all the levers 254. The bail 360 is pivoted to arms 361 and 362 secured to a sleeve 363 loose on a rod 364 carried by the frames 189 and 190.

During a two cycle operation, the bail 360 is moved downwardly near the end of the first cycle to block any upward movement of the rear ends of the levers 254 during the second cycle, thus preventing selection of the counters associated with said levers during the second cycle. The means for actuating the bail 360 will now be described.

The shaft 175 (Fig. 6), as previously explained herein, received an initial clockwise rotation when the total lever 54 is manually moved from its add position to either a total or sub-total taking position, and a further clockwise rotation near the end of the first cycle of a two cycle operation.

Such clockwise rotation of the shaft 175, through connections hereinbefore described, causes the shaft 188 to be rotated counter-clockwise a corresponding extent.

The shaft 188 has fast thereon an arm 365 (Figs. 6 and 9), carrying a stud 366 which is adapted to coact with a surface 367 and a notch 368 formed in the arm 362. When the shaft 188 receives its initial counter-clockwise rotation through movement of the total lever 54 to one of its total or sub-total taking positions, the stud 366 rides along the surface 367, which is concentric with the shaft 188, without effecting any movement of the arm 362. When the shaft 188 receives its further counter-clockwise rotation during the first cycle of a two cycle operation, the stud 366 engages the notch 368 and rocks the arm 362 and, through the sleeve 363, the arm 361 clockwise to carry the bail 360 downwardly to its effective blocking position. Near the end of the second cycle of said operation, the shaft 188 is rotated clockwise to its normal position, thereby causing the stud 366 to move out of the notch 368 to restore the arms 362, 361 and bail 360 to their normal positions.

Counter reset mechanism

The special counters in the first two rows (Fig. 2) are identified with individual clerks, whereas the counters in the other two rows except the total and sub-total counters are each identified with all of the clerks. It is sometimes desirable, for example, where the clerks work on different shifts, to reset the individual clerk counters when changing shifts, and at the same time keep as a running total the amounts on the counters identified with the clerks in general. For this purpose the machine is provided with a single reset lever 380 common to all of the counters and which is adapted to be first manually moved counter-clockwise or forwardly to perform a resetting operation, and then clockwise or rearwardly to return it to its home position. This lever has two positions of adjustment, a lower position and an upper position. In its lower position the lever 380 is adapted to reset the two rows of individual clerk counters, while in its upper position it is adapted to reset the other two rows of counters except the total and the sub-total counters.

Referring particularly to Fig. 17, the shafts 210 and 211, which rotatably support the counter wheels 220 of the individual clerks' counters, have secured thereto pinions 382 and 383, respectively, while the shafts 212 and 213, which rotatably support the wheels 220 of the transactions and customer counters have secured thereon pinions 384 and 385, respectively. The pinions 382 and 383 mesh with an idler gear 386 freely mounted on a stud 387 in the frame 190, while the pinions 384 and 385 mesh with an idler gear 388 freely mounted on a stud 389 carried by the frame 190. The gears 386 and 388 mesh with gears 390 and 391, respectively, (Fig. 19), both loosely mounted on a stud 392 in the frame 190.

The gear 386 (Fig. 17) and its associated gear 390 are located on one side of a spacer plate 393 mounted on the studs 387 and 389, while the gear 388 and its associated gear 391 are located on the opposite side of said plate 393. The plate 393, therefore, serves to keep the proper sets of gears in alinement and said pairs of gears in non-interfering relation.

Each of the shafts 210 to 213, inclusive, is provided with the usual groove 394 (Fig. 20) which is adapted when said shafts are rotated counter-clockwise to coact with a spring-pressed reset pawl 395 carried by each counter wheel 220 to reset said wheel to zero. The reset lever 380 when in its lower position of adjustment is adapted to actuate the gear 390 to cause the shafts 210 and 211 to be rotated in a counter-clockwise direction to reset to zero the counter wheels 220 supported thereon. When the lever 380 is in its upper position of adjustment it is adapted to actuate the gear 391 to cause the shafts 212 and 213 to be rotated in a counter-clockwise direction to reset the counter wheels 220 supported thereon. The means by which the lever 380 actuates the gears 390 and 391 to reset all of the counter wheels 220 will now be described.

The lever 380 is arranged so that manual movement thereof forwardly or in a counter-clockwise direction effects the resetting to zero of two rows of counters simultaneously, the two rows of counters thus reset being dependent upon the position in which said lever is adjusted. The lever 380 (Figs. 17 and 19) has a slot 400 and surrounds the stud 392 to slide and pivot thereon. Also pivotally mounted on the stud 392 is a disk 401 having slots 402 which receive studs 403 on the lever 380 and guide said lever from one position of adjustment to another.

On the opposite side of the lever 380 is mounted a stud 404 adapted to selectively connect said lever 380 with either one of the gears 390 or 391. This is accomplished by means of the stud 404 coacting with irregularly shaped slots 405 and 406 in the gears 390 and 391, respectively, which slots are concentric with the stud 392. The slots 405 and 406 terminate at their right-hand ends in radial offset portions 407 and 408, respectively.

When the lever 380 is in its lower position of adjustment, the stud 404 engages the offset portion 407 of the slot 405 to connect said lever 380 with the gear 390, thus enabling the lever 380 to drive the gear 390 counter-clockwise to reset to zero the individual clerks' counters on the shafts 210 to 211. When the lever 380 is shifted to its upper position of adjustment, the stud 404 engages the offset portion 408 of the slot 406, thereby connecting said lever 380 with the gear 391, thus enabling the lever 380 to drive the gear 391 counter-clockwise to reset to zero the counters on the shafts 212 and 213. When one or the other of the gears 390 or 391 is driven by the lever 380, through the engagement of the stud 404 with one of the offset portions 407 or 408 in said gears, the stud 404 will ride idly in the concentric portion of the slot 405 or the slot 406 of the other one of said gears which is not driven.

When the lever 380 has been moved the full extent of its forward stroke, it is then manually returned to its home position. When this occurs, the stud 404 returns whichever one of the gears 390 or 391 with which it is connected to its normal position.

Means is provided for preventing movement of the lever 380 out of its adjusted position after it commences its resetting movement until it is returned to its home position. This means consists of a circular plate 414 (Fig. 19) with a guide rail 415 concentric with the stud 392 and fastened to the frame 190. The rail 415 has an opening 416 opposite a stud 417 on the lever 380 when said lever is in its home position. Shifting of the lever 380 to either of its positions of adjustment will place the stud 417, through the opening 416, on one side or the other of the guide rail 415. When the lever 380 is moved out of its home position, the stud 417 will ride on whichever side of the rail 415 it has been positioned and will thus prevent any movement of the lever 380 out of its adjusted position during a resetting operation.

A full stroke device is provided for locking the lever 380 against reverse movement when traveling in either direction until the stroke has been completed. This device consists of a two arm pawl 420 (Fig. 17) which, by means of a slot 421 surrounding a stud 422 mounted in the frame 190, is slidably and pivotally mounted on said stud. A retaining pawl 423, pivoted on a stud 424 in the frame 190, serves to maintain the pawl 420 in cooperative relation with teeth 425 of the disk 401. The pawl 423 is constantly urged clockwise by a spring 426 connected to a stud 427 in the pawl 423 and to a stud 428 in the frame 190.

The pawl 420 is normally held in the position shown in Fig. 17 by the retaining pawl 423 which, through the spring 426, causes a forward edge 429 thereof to bear against the right side of a nose 430 of the pawl 420, thus tending to rotate the pawl 420 in a clockwise direction and also to retain the right end of the slot 421 against the stud 422. The clockwise movement of the pawl 420 causes a nose 431 thereof to ratchet in and out of the teeth 425 when the lever 380 is moved counter-clockwise.

As the lever 380 and disk 401 approach the end of their counter-clockwise movement, a finger 432 on the disk 401 will strike the nose 431 and slide the pawl 420 to the right on the stud 422. This sliding movement of the pawl 420 cams the retaining pawl 423 against the action of the spring 426 until the apex of the nose 430 of the pawl 420 passes the apex of the angle formed by the side 429 and another side 433 of the retaining pawl 423, whereupon the retaining pawl 423 is free to rock clockwise to bring the side 433 into contact with the left side of the nose 430 of the pawl 420.

This results in the pawl 420 being cammed counter-clockwise about the stud 422 which at this time is seated in the left end of the slot 421. Such counter-clockwise movement of the pawl 420 withdraws the nose 431 out of cooperative relation with the teeth 425 and throws a nose 434 of the pawl 420 into cooperative relation with the teeth 425.

Upon return clockwise movement of the lever 380 the nose 434 of the pawl 420 ratchets in and out of the teeth 425 until the lever 380 reaches its home position, whereupon a finger 435 on the disk 401 coacts with the nose 434 and rocks said pawl 420 clockwise to the position shown in Fig. 17, wherein the nose 431 again becomes engaged with the teeth 425 on the disk 401.

*Locking means for total lever and counter reset lever*

The total lever 54 is adapted to be manually moved downwardly from its normal or add position to three separate positions of adjustment for conditioning the machine to perform total taking operations involving different classes of data, said positions being designated in Fig. 1 by the numbers 1, 2 and 3. When the lever 54 is moved to the No. 1 position it conditions the machine for item total taking operations, in the No. 2 position it conditions the machine for taking totals from the clerks' totalizers, and in the No. 3 position it conditions the machine for taking totals from the transaction totalizers.

Locking means is provided for normally locking the lever 54 out of its Nos. 2 and 3 positions of adjustment. The lever 54 is always free to be moved from its normal or add position to its No. 1 or item total taking position for the purpose of taking totals of multiple item transactions. In addition to the function of locking the lever 54 out of its Nos. 2 and 3 positions of adjustment, said locking means performs another function, namely, locking the counter reset lever 380 against operation when the total lever 54 is locked out of the above mentioned positions. Inasmuch as only this last named function is pertinent to the present invention, a description thereof only will be given herein.

Said locking means consists of a lock 440 (Fig. 18) adjacent the total lever 54 and mounted on a total lever frame 441. This lock 440 is adapted, when a key is inserted therein, to operate a bolt 442 provided with a bar 443 and a lug 444. The bar 443 coacts with the lever 54 to lock it out of the positions above mentioned, while the lug 444 serves to lock the counter reset lever 380 against operation. The lug 444 has a slot 445 engaged by a pin 446 on an arm 447 of a link 448. The arm 447 is pivoted to an arm 449 pivoted on a stud 450 in the frame 441. The link 448 is pivoted to a locking lever 451 pivoted on a stud 452 in the frame 190. The lever 451 has a hook 453 which engages over the upper end of an arcuate plate 454 fast to the disk 401 to lock said disk and its associated reset lever 380 against operation. The plate 454 also serves to guide the hook 453 and the lever 451 when the disk 401 and the reset lever 380 are being operated, and to prevent the locking lever 451 from being moved to locking position when the reset lever 380 is out of its home position.

It will be seen from the above that when the lock 440 is operated by a key to move the bolt 442 to the right, as viewed in Fig. 18, it will through the slot and pin connection 445 and 446 lower the link 448 to rock the lever 451 clockwise to disengage the hook 453 from the plate 454, thus releasing the disk 401 and the reset lever 380 for operation.

*Operation*

It is thought that a summary of the operation of the present machine when registering a single item transaction and a multiple item transaction will further aid in a clear understanding of the present invention.

For example, let it be assumed that clerk "A" is entering a single item cash transaction. The clerk "A" key 51 (Figs. 1 and 3) and the transaction "Cash" key 53 (Figs. 1 and 5) are depressed, together with the amount keys 50 representing the amount of the transaction. Then upon operation of the machine, the key for clerk "A" will control the differential adjustment of the shaft 102 (Figs. 6 to 9) and the disks 270 to 279 thereon to an extent corresponding to said depressed key.

Likewise, the transaction "Cash" key 53 will control the differential adjustment of the shaft 104 and the pairs of disks thereon to an extent corresponding to that depressed key. Only the right-hand disk, of which disk 280 is exemplary, of each of said pairs of disks is normally in cooperative relation with its associated one of the disks 270 to 279.

After the disks have been positioned as above described, if the notched portions of the corresponding disks on both shafts 102 and 104 are in effective selecting position, the feeling levers 254 associated therewith will coact with said disks to effect selection of their associated counters. This is accomplished by the projections 284 and 285 on the levers 254 engaging the notched portions of said disks, thereby causing the forward ends of said levers to remain in blocking relation with the studs 253 and thus, upon oscillation of the counter actuating frame, cause the counters associated with said disks to be actuated. In this case it will be the "A," "A item," "Cash," "Cash item," and "Customer" counters which will be actuated.

The levers 254 associated with those disks having their notched portions out of effective selecting position, will coact with the unnotched portions of said disks and thereby cause said levers 254 to rock about the rod 255. This causes the forward ends of said levers 254 to be raised out of the paths of the studs 253 associated therewith and, upon oscillation of the counter actuating frame, prevents actuating of the counters associated with said disks.

Where said pairs of disks have no associated disks on the shaft 102, then the right-hand disk, of which the disk 282 is representative, of each of said pairs of disks will alone control the selection of its associated counter in a manner similar to that above described.

For another example, and referring to Figs. 1, 3 and 5, let it be assumed that clerk "A" is entering a multiple item charge transaction into the machine. The clerk "A" key 51 and the "Item charge" key 52 are depressed, together with the amount keys 50 representing the amount of one of the items. Then upon operation of the machine, the key 51 and the key 52 control the differential adjustment of the disks on their associated shafts 102 and 104, respectively (Figs. 6 to 9) to control the selection of the counters. Said disks cooperate with their respective levers 254 to control the selection of the counters in a manner similar to that described above in connection with the entry of a single item transaction into the machine.

In Fig. 16, all of said disks are shown in the positions they assume during this particular operation, the disks associated with each counter, except the "Total" and "Sub-total" counters, being separately shown in each of the squares. By a comparison of this figure it will be seen that during this item adding operation the lever 254 associated with each counter will coact with the disks as shown in the upper half of each of said squares and will select the "A item" and "Charge item" counters for operation.

In taking a total of said multiple item transaction, the total lever 54 (Figs. 1 and 14) is manually moved to its No. 1 or item total taking position, whereupon the shaft 104 (Figs. 8 and 9) and the pairs of disks secured thereon are shifted to the right. This moves the right-hand disk, of which disks 280 and 282 are representative, of each of said pairs of disks out of effective position and, at the same time, moves the left-hand disk, of which disks 281 and 283 are representative, of each of said pairs of disks into effective position. The relative positions of disks at this time are shown in the lower half of each of the squares in Fig. 16, in which positions said disks cooperate with their associated levers 254 to select the "A," "Charge" and "Customer" counters for operation.

Also in total taking or sub-total taking operations, the movement of the total lever 54 to corresponding controlling position sets selecting plates 300 and 301 to position notches 310 and 312 formed therein in effective position relative to the studs 306 and 308 on the levers 303 and 304, respectively, which levers 303 and 304 correspond to and function similarly to the levers 254, heretofore described. It is thus seen that, depending upon the position to which the total lever 54 has been shifted, either the "Total" or "Sub-total" counter will be selected for operation.

When it is desired to reset the special counters to zero, the manager or some other authorized person unlocks the lock 440 (Fig. 18), thereby moving the link 448 downwardly to rock the lever 451 (Fig. 17) clockwise to release the counter reset lever 380 for operation. The lever 380 is then manually moved to the full extent of its forward stroke to reset to zero two of said rows of counters, after which the lever is returned to its home position. If the lever 380 is in its lower position of adjustment, it will cause the two rows of individual clerks' counters to be reset to zero, but if said lever has been manually shifted to its upper position, it will cause the two rows of general clerks' counters to be reset to zero.

While the form of mechanism herein shown and described, is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of counters; actuating means for said counters; manipulative means; a plurality of rotatable elements; means operable to be differentially positioned under control of said manipulative means and to rotate said elements; mechanism controlled by said elements to control the effectiveness of said actuating means to select various ones of said counters for actuation; and means operable to shift one of said rotatable elements laterally to effect a different cooperation between said disks and mechanism and a different selection of said counters for actuation.

2. In a machine of the class described, the combination of a plurality of counters; actuators for said counters; a plurality of control keys; a plurality of groups of rotatable counter selection control members; means differentially positioned under control of said keys and operable to position said disks; mechanism cooperating with the disks and actuators to select various ones of said counters for operation; a manipulative element having a normal position and a plurality of positions of adjustment; and means operated by the manipulative element, when moved to a certain one of its positions of adjustment to shift one of said groups of rotatable members relatively to the other group to control the mechanism to effect a different selection of said counters without disturbing the differential adjustment of said disks.

3. In a machine of the class described, the combination of a plurality of counters; a plurality of actuating means therefor; a bank of control means; a second bank of control means divided into groups; means for controlling the actuating means to actuate all counters upon the operation of any one of the means in the first bank and any one of the means in one of the groups of means in the second bank, and for controlling the actuating means to prevent the operation of certain of said counters upon the operation of said means in the first bank and the operation of any means of another group of means in the second bank; and a special manipulative means adapted to be operated as a preliminary to an operation immediately following an operation in which the last two mentioned means are operated, to control the actuating means to operate the remaining plurality of counters.

4. In a machine of the class described, the combination of a counter; actuating means therefor; a plurality of control keys; a plurality of disks; means operated under control of said keys to differentially position said disks; mechanism controlled by said disks to control the effectivity of said actuating means; a manipulative member; and means under control of said member to shift certain of said disks to cause the control of the mechanism to be changed to render said actuating means ineffective.

5. In a machine of the class described, the combination of a counter; actuating means therefor; a single disk; a pair of disks shiftable into positions where one or the other is in controlling relation with said single disk; a mode of operation control member; means operated by said member to shift said pair of disks into said positions; and mechanism controlled by the single disk and the one of the pair of disks that is in controlling relation with said single disk to determine the effectivity of said actuating means.

6. In a machine of the class described, the combination of a counter; actuating means therefor; a single disk; a pair of disks; means for shifting said pair of disks to positions where one or the other is in controlling relation with said single disk; and a member cooperable simultaneously with said single disk and selectively with one or the other of said pair of disks to control the effectivity of said actuating means.

7. In a machine of the class described, the combination of a counter; actuating means therefor; a single disk provided with high and low places thereon; a pair of disks each provided with high and low places thereon, said disks being shiftable to position one or another of said disks in alinement with said single disk; means to shift said pair of disks; a member; and a plurality of projections on said member cooperable with the high and low places on said single disk and whichever one of said pair of disks is in alinement therewith to control the effectivity of said actuating means.

8. In a machine adapted to perform adding and total taking operations, the combination of a counter; actuating means therefor; a plurality of rotatable members adapted to control the effectivity of said actuating means; means coacting with the members and the actuating means to carry out the control of said members; a plurality of control keys; means controlled by said keys and operable to cause the differential positioning of said rotatable members so that certain of the members can render selected actuating means effective during adding operations; a total lever; and connections between said lever and certain of said members and operable to position certain of said members further to enable the members to control the co- acting means to render said actuating means ineffective during total taking operations.

9. In a machine adapted to perform adding operations and total taking operations, the combination of a counter; actuating means for said counter control keys; a total lever for conditioning the machine for total taking operations; a pair of rotatable control members; mechanism coacting with the members to cause the actuating means to be effective or ineffective according to the control of the rotatable members; means for rotatably adjusting said members under control of said keys; means for shifting the members laterally under control of said lever to cause one of said members to cooperate with the mechanism to control the selective actuation of the counter during adding operations and the other one of said members to cooperate with the mechanism to control the selective operation of the counter during total taking operations.

10. In a machine of the class described, the combination of a plurality of counters; actuators for said counters; a plurality of control keys; a plurality of groups of counter operation control members; differential means for positioning said members under control of said keys; means cooperating with said members and said actuating means to control the selective operation of said counters; and shifting means to shift one of said groups, while the members remain in their differential positions, to enable other members of said shifted group to control the mechanism and thus cause a selection of different counters for operation.

11. In a machine of the class described, the combination of a plurality of counters; actuating means for said counters; a plurality of control keys; a plurality of lines of rotatable members; a plurality of differentially operable means, each controlled by a different plurality of control keys and each operable to rotate a different line of members; mechanism selectively controlled by said members and cooperable with said actuating means to select the counters for operation; a manipulative member; and means operated by said member for shifting one line of members relative to the other so that with the same differential positioning of the members their control of the mechanism will be varied.

12. In a machine of the class described, the combination of a plurality of counters; actuating means for said counters; a plurality of control keys; a plurality of rotatable disks for controlling the selective operation of said counters; means controlled by said control keys for rotating said disks differentially; mechanism controlled by said disks and cooperating with the actuating means for rendering the actuating means selectively effective to operate the counters; a manipulative member; and cam means operated by the member to shift the disks relative to the mechanism, while the disks remain in said differential position, to change the selection of counters for operation.

13. In a machine of the class described, the combination of a plurality of counters; separate actuating means for each of said counters; a common operating means connected to said separate actuating means but normally ineffective to operate said actuating means; a plurality of disks associated with each counter; a plurality of control keys; means operated under control of said keys to cause the differential positioning of said disks; and a plurality of members, one for each counter, coacting with the disks associated with its related counter and actuating means to determine the effectivity of the common operating means on the actuating means associated with its respective counter.

14. In a machine of the class described, the combination of a plurality of groups of counters; actuating means for said counters; a plurality of shafts having secured on each thereof a plurality of disks; a plurality of banks of control keys; means controlled by the keys in each of said banks for differentially positioning one of said shafts and the disks thereon; mechanism cooperating with the disks and the actuating means for causing a selective operation of the actuating means to thereby select a variable number of said counters in different groups for operation; and a pair of cams to shift one of said shafts longitudinally to change the relation between the disks and mechanism to cause a different selective operation of the actuating means.

15. In a machine of the class described, the combination of a counter; actuating means for said counter; a plurality of control keys; a pair of rotatable elements; means differentially positioned under control of said keys and operable to rotate said elements; mechanism cooperating with one of said elements and said actuating means to render the actuating means selectively effective; manipulative means; and shifting means under control of said manipulative means operable to shift said one element out of cooperative relation with said mechanism and the other of said elements into cooperative relation with the mechanism to render the actuating means selectively effective under control of the other of said elements.

WILLIAM H. ROBERTSON.
JOHN P. FRANK.

CERTIFICATE OF CORRECTION.

Patent No. 2,241,272. May 6, 1941.

WILLIAM H. ROBERTSON, ET AL.

It is hereby certified that error appears in the printed specification of the above numbered patent requiring correction as follows: Page 1, first column, line 24, for the word "operating" read --operated--; page 13, second column, line 63-64, claim 2, after "adjustment" insert a comma; page 14, second column, line 6, claim 9, after "counter" insert a semicolon; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.